United States Patent
Singh et al.

(10) Patent No.: US 9,923,835 B1
(45) Date of Patent: Mar. 20, 2018

(54) COMPUTING PATH MAXIMUM TRANSMISSION UNIT SIZE

(71) Applicant: Juniper Networks, Inc., Sunnyvale, CA (US)

(72) Inventors: Prashant Singh, Bangalore (IN); Sairam Neelam, Hyderabad (IN)

(73) Assignee: Juniper Networks, Inc., Sunnyvale, CA (US)

( * ) Notice: Subject to any disclaimer, the term of this patent is extended or adjusted under 35 U.S.C. 154(b) by 100 days.

(21) Appl. No.: 14/862,797

(22) Filed: Sep. 23, 2015

(51) Int. Cl.
*H04L 12/805* (2013.01)
*H04L 29/06* (2006.01)

(52) U.S. Cl.
CPC ............ *H04L 47/365* (2013.01); *H04L 69/22* (2013.01)

(58) Field of Classification Search
CPC .......... H04L 12/4633; H04L 29/12575; H04L 47/825; H04L 61/2592; H04L 2212/00; H04L 47/36; H04L 69/166; H04L 29/06136
See application file for complete search history.

(56) References Cited

U.S. PATENT DOCUMENTS

| | | | | |
|---|---|---|---|---|
| 8,532,107 B1* | 9/2013 | Ghosh | ................. | H04L 12/4633 370/392 |
| 2003/0076850 A1* | 4/2003 | Jason, Jr. | ............ | H04L 12/2697 370/414 |
| 2007/0268918 A1* | 11/2007 | Gopi | .................. | H04L 12/4633 370/401 |
| 2010/0322249 A1* | 12/2010 | Thathapudi | ............. | H04L 47/10 370/395.1 |
| 2011/0103399 A1* | 5/2011 | Bransi | ................. | H04L 12/4633 370/470 |
| 2014/0241144 A1* | 8/2014 | Kashyap | ............... | H04L 47/365 370/216 |
| 2015/0081863 A1* | 3/2015 | Garg | ....................... | H04L 41/00 709/223 |
| 2015/0341278 A1* | 11/2015 | Sundar | .................. | H04L 47/365 370/392 |

(Continued)

OTHER PUBLICATIONS

"Supporting User Flow Mobility in GRE Notifications for Hybrid Access"; Jun. 17, 2015; Sarikaya et al.*

(Continued)

*Primary Examiner* — Benjamin H Elliott, IV
(74) *Attorney, Agent, or Firm* — Shumaker & Sieffert, P.A.

(57) ABSTRACT

Techniques include quickly establishing a maximum transmission unit (MTU) for a network path, such as a network tunnel. In one example, data representative of the MTU is included in a header of a packet. If the MTU indicated in the packet is larger than a downstream network interface of a network device, the network device updates the data of the header to indicate the MTU of the downstream network interface, and an egress network device sends the packet back to an ingress network device. In another example, network devices fragment packets, if necessary, such that the fragments satisfy the MTU of the downstream network interface. The egress network device then determines the MTU for the path based on a largest received fragment, reassembles the fragments into a single packet, and returns the reassembled packet to the ingress network device. The packets may comprise echo packets of generic routing encapsulation (GRE).

44 Claims, 9 Drawing Sheets

(56) References Cited

U.S. PATENT DOCUMENTS

2016/0316024 A1\* 10/2016 Di Benedetto ......... H04L 45/14
2017/0019331 A1\* 1/2017 Yong ....................... H04L 45/64

OTHER PUBLICATIONS

"GRE Notifications for Hybrid Access"; Jun. 27, 2015; Leymann et al.\*
"Darpa Internet Program Protocol Specification," RFC: 791, Sep. 1981, 50 pp.
Mogul et al., "Path MTU Discovery," Network Working Group, RFC 1191, Nov. 1990, 19 pp.
Farinacci et al., "Generic Routing Encapsulation," Network Working Group, RFC 2784, Mar. 2000, 9 pp.
Dommety, "Key and Sequence Number Extensions to GRE," Network Working Group, RFC 2890, Sep. 2000, 7 pp.

\* cited by examiner

COMPUTING PATH MAXIMUM TRANSMISSION UNIT SIZE

TECHNICAL FIELD

This disclosure relates to packet-based network computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network devices and network links are bounded as to the size of packets or other blocks of data that can be transmitted between two given devices across a given link. This upper-bound is commonly referred to as a "maximum transmission unit" (MTU), also commonly referred to as a "maximum transfer unit." RFC 791 establishes a lower-bound for MTUs of 576 bytes. That is, RFC 791 requires that network devices and network links be capable of supporting MTUs of at least 576 bytes. However, manufacturers are free to support larger MTUs, and many manufacturers frequently do so. Further details on RFC 791 can be found in "INTERNET PROTOCOL: DARPA INTERNET PROGRAM PROTOCOL SPECIFICATION," Information Sciences Institute, University of Southern California, September 1981, the entire contents of which are incorporated herein by reference.

When two segments of a route or path between two networking devices support different MTUs, one of the devices involved in the communication session typically resolves the MTU for the path. One conventional method for doing so, described by RFC 1191, involves the use of the Internet Control Message Protocol (ICMP) to determine the MTU for the path. In particular, RFC 1191 prescribes path MTU discovery (PMTUD) by sending a plurality of different-sized packets, each with a "don't fragment" (DF) flag set. When a downstream router receives a packet that is too large for the subsequent link, and with the DF flag set, the router will return an ICMP "Destination Unreachable" message and discards the packet. The source router then reduces its assumed PMTU size for the path and ultimately determines that the PMTU is the size of a penultimate packet sent before receiving an ICMP destination unreachable message. Further details can be found in RFC 1191 by J. Mogul et al., entitled "PATH MTU DISCOVERY," Network Working Group, Internet Engineering Task Force (IETF), November 1990, the entire contents of which are incorporated herein by reference.

SUMMARY

In general, this disclosure describes techniques for discovering a maximum transmission unit (MTU) for a network path, such as a network tunnel. The techniques involve an ingress network device for the network tunnel sending a first packet including data indicative of a link MTU for the ingress network device. For example, the data indicative of the link MTU may be included in an outer label of the first packet. In some examples, the ingress network device sets data, such as a flag, e.g., in the outer label, indicating that the packet is to be used to establish the path MTU, and therefore, downstream network devices along the path should update the data representative of the current path MTU as discussed below. The first packet may comprise an echo packet of generic routing encapsulation (GRE) Keepalive, Bidirectional Forwarding Detection (BFD), Operations, Administration, and Maintenance (OAM), or other types of packets that have an echo property.

Additionally or alternatively, a size of the packet may represent a current path MTU. That is, the ingress network device may construct the packet such that the size of the packet is equal to the link MTU.

Intermediate network devices of the network path, such as routers, may (e.g., based on the flag) determine whether the current path MTU (as indicated by data of the packet) is greater than an MTU for a downstream link of the network path. If so, the intermediate network devices may form a second packet including data that reflects the MTU for the downstream link as the current path MTU. In one example, the intermediate network devices update data of an outer label of the first packet to reflect the MTU for the downstream link, thereby forming the second packet. In another example, the intermediate network devices fragment the first packet into a plurality of fragments, at least one of the fragments having a size equal to the MTU for the downstream link. Thus, the second packet would correspond to the fragment having the size equal to the MTU for the downstream link.

The egress network device for the network path may ultimately return a packet including data indicative of the path MTU to the ingress network device, e.g., based on the data of the packet. For example, after receiving a packet including data indicative of the path MTU, the egress network device may send the packet back to the ingress network device. Assuming the packet is encapsulated with an outer label and an inner label, the outer label including data indicative of the current path MTU, the egress network device may pop (that is, remove) the outer label, add data indicative of the path MTU to the inner label, and forward the packet back to the ingress network device. In addition, the egress network device may set a flag in the inner label indicating that the MTU of the inner label represents the computed path MTU and therefore is not to be modified. In some examples, the egress network device may further determine the path MTU as the size of a largest packet fragment of a plurality of received packet fragments. The egress network device may reassemble the plurality of received packet fragments into a single packet, add data indicative of the path MTU to an inner label of the reassembled packet, and forward the reassembled packet including the inner label to the ingress network device.

In one example, a method performed by an egress network device of a network path includes receiving a first packet including data indicative of a maximum transmission unit (MTU) for the network path, forming, from the first packet, a second packet to include a path header corresponding to the network path such that the path header includes the data indicative of the MTU for the network path, and sending the second packet to an ingress network device of the network path.

In another example, an egress network device for a network path includes one or more network interfaces configured to send packets to an upstream network device of the network path and to receive packets from the upstream network device, and a processing unit configured to: receive, via the one or more network interfaces, a first packet including data indicative of a maximum transmission unit (MTU) for the network path, form, from the first packet, a second packet to include a path header corresponding to the network path such that the path header includes the data indicative of the MTU for the network path, and send, via the one or more network interfaces and the upstream network device, the second packet to an ingress network device of the network path.

In another example, a non-transitory computer-readable medium, such as a computer-readable storage medium, has stored thereon instructions that, when executed, cause a processor of an egress network device of a network path to receive a packet including data indicative of a maximum transmission unit (MTU) for the network path, form, from the first packet, a second packet to include a path header corresponding to the network path such that the path header includes the data indicative of the MTU for the network path, and send the second packet to an ingress network device of the network path.

In another example, a method performed by an intermediate network device of a network path includes receiving a first packet including data indicative of a current maximum transmission unit (MTU) for the network path, determining whether the current MTU for the network path is greater than an MTU for a network interface of the intermediate network device that is coupled to a downstream network device of the network path, and when the current MTU is greater than the MTU for the network interface, sending a second packet to the downstream network device, the second packet including data indicative of the MTU for the network interface as a new MTU for the network path.

In another example, an intermediate network device of a network path includes one or more network interfaces configured to receive packets from an upstream network device of the network path and to send packets to a downstream network device of the network path; and a processing unit configured to receive a first packet including data indicative of a current maximum transmission unit (MTU) for the network path via the one or more network interfaces from the upstream network device, determine whether the current MTU for the network path is greater than an MTU for a network interface of the network interfaces that is coupled to the downstream network device, and when the current MTU is greater than the MTU for the network interface, send a second packet to the downstream network device via the network interface coupled to the downstream network device, the second packet including data indicative of the MTU for the network interface as a new MTU for the network path.

In another example, a non-transitory computer-readable medium, such as a computer-readable storage medium, has stored thereon instructions that, when executed, cause a processor of an intermediate network device to receive a first packet including data indicative of a current maximum transmission unit (MTU) for the network path, determine whether the current MTU for the network path is greater than an MTU for a network interface of the intermediate network device that is coupled to a downstream network device of the network path, and when the current MTU is greater than the MTU for the network interface, send a second packet to the downstream network device, the second packet including data indicative of the MTU for the network interface as a new MTU for the network path.

In another example, a system includes an ingress network device of a network path, an egress network device of the network path, and one or more intermediate network devices of the network path between the ingress network device and the egress network device. The intermediate network devices are configured to receive a first packet including data indicative of a current maximum transmission unit (MTU) for the network path, determine whether the current MTU for the network path is greater than an MTU for a network interface of the corresponding intermediate network device that is coupled to a downstream network device of the network path, the downstream network device comprising one of the intermediate network devices or the egress network device, and, when the current MTU is greater than the MTU for the network interface, send a second packet to the downstream network device, the second packet including data indicative of the MTU for the network interface as a new MTU for the network path. The egress network device is configured to receive a third packet including data indicative of a final maximum transmission unit (MTU) for the network path, form, from the third packet, a fourth packet to include a path header corresponding to the network path such that the path header includes the data indicative of the final MTU for the network path, and send the fourth packet to the ingress network device of the network path.

The details of one or more examples are set forth in the accompanying drawings and the description below. Other features, objects, and advantages will be apparent from the description and drawings, and from the claims.

DETAILED DESCRIPTION

Figure 1:
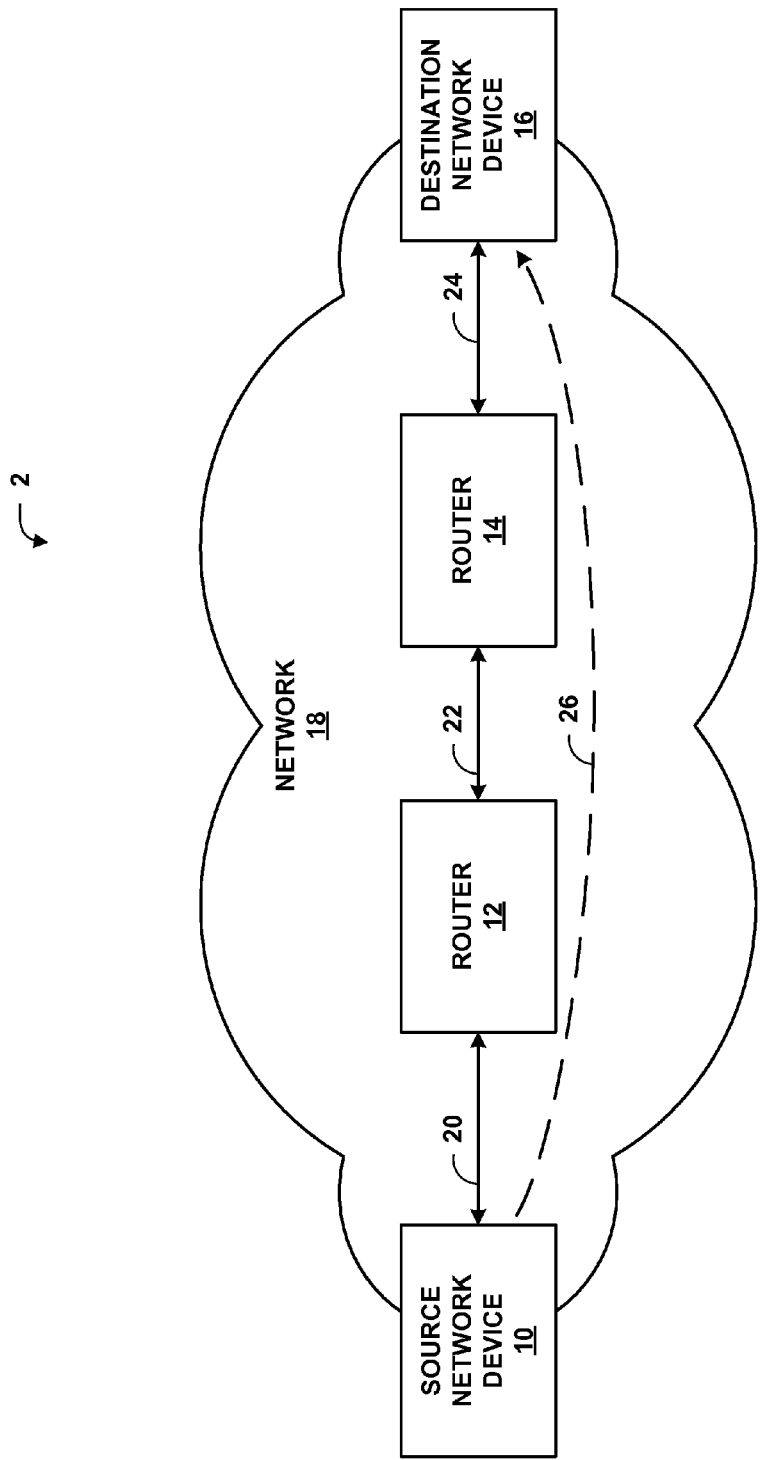
FIG. 1 is a block diagram illustrating an example system in which a source network device and a destination network device determine a path maximum transmission unit (PMTU) in accordance with the techniques of this disclosure.

FIG. 1 is a block diagram illustrating an example system 2 in which a source network device 10 and a destination network device 16 determine a path maximum transmission unit (PMTU) in accordance with the techniques of this disclosure. In the example of FIG. 1, source network device 10 determines the PMTU for path 26 between source network device 10 and destination network device 16.

Source network device 10 is coupled to destination network device 16 by path 26, which traverses network 18 and, in particular, through intermediate routers 12 and 14. Although two routers are depicted in the example of FIG. 10, the techniques of this disclosure are applicable to any number and any type of intermediate network devices between two endpoint devices, such as source network device 10 and destination network device 16. Such intermediate devices include, for example, routers, gateways, switches, hubs, bridges, intrusion detection and prevention devices, firewalls, wireless access points, modems, and other such network devices.

In the example of FIG. 1, source network device 10 is coupled to router 12 via network link 20. Router 12 is coupled to router 14 via network link 22. Router 14 is coupled to destination network device 16 via network link 24. Any of links 20, 22, and 24 may comprise wireless or wired links, such as Ethernet links, Gigabit Ethernet links, wireless 802.11 links, satellite links, cable links, digital subscriber line (DSL) links, copper PHY links, fiber optic links, or other suitable physical or wireless transmission media. In accordance with the techniques of this disclosure, source network device 10 calculates the PMTU of path 26 as the minimum link MTU of links 20, 22, and 24.

A link MTU is the MTU of a link (or network connection) that couples two network devices. That is, a first link MTU is defined for link 20 between source network device 10 and router 12. The first link MTU of link 20 is the largest unit of data that can be sent between source network device 10 and router 12 across link 20. Similarly, a second link MTU is defined for link 22 between router 12 and router 14, and a third link MTU is defined for link 24 between router 14 and destination network device 16. The path MTU is the MTU supported by each network device and network link along a path between two endpoint devices. In accordance with the techniques of this disclosure, source network device 10 calculates the path MTU for path 26 as minimum (first link MTU, second link MTU, third link MTU). That is, source network device 10 determines that the PMTU of path 26 is the minimum of all of the link MTUs of path 26.

In one example, the first link MTU of link 20 is 3,300 bytes, the second link MTU of link 22 is 5,000 bytes, and the third link MTU of link 24 is 1,500 bytes. In this example, source network device 10 would determine that the PMTU of path 26 is 1,500 bytes, because 1,500 bytes is the minimum of all of the link MTUs. By determining that the PMTU is equal to the minimum of the link MTUs, each device and link along the path will be able to support the determined PMTU. That is, each device and link will support transmission units at least as large as those of the PMTU. In the example above, where source network device 10, router 12, and link 20 comprise a link MTU of 3,300 bytes, source network device 10, router 12, and link 20 will also support transmission units of 1,500 bytes.

Source network device 10, routers 12, 14, and destination network device 16 act in concert to determine the PMTU of path 26. That is, each of source network device 10, destination network device 16, and routers 12 and 14 are configured according to the techniques of this disclosure. In one example, source network device 10 sends an echo packet to destination network device 16 via path 26. In some examples, path 26 represents a network tunnel, such as a generic routing encapsulation (GRE) tunnel. GRE is described in Farinacci et al., "Generic Routing Encapsulation (GRE)," Network Working Group, Request for Comments 2784, March 2000, available at tools.ietf.org/html/rfc2784, which is hereby incorporated herein by reference.

Source network device 10 may alternatively be referred to as an ingress network device for path 26, while destination network device 16 may alternatively be referred to as an egress network device for path 26. That is, destination network device 16 forwards network data beyond path 26. For instance, source network device 10, destination network device 16, and routers 12, 14 may maintain routing and forwarding tables (e.g., virtual routing and forwarding (VRF) tables) dedicated to path 26. Thus, when forwarding data along path 26, these network devices may use the dedicated routing and forwarding tables for path 26, whereas when forwarding data separately from path 26, these network devices may use default routing and forwarding tables.

In general, packets exchanged throughout system 2 include one or more headers and a payload. Packets often comprise headers for each layer of the open systems interconnection (OSI) networking model. In the example of a TCP/IP packet, such a packet comprises both a TCP header and an IP header. The payload of a packet generally comprises application-layer data. In accordance with the techniques of this disclosure, routers 12 and 14 remove data from the payload of the packet and may modify various data of the headers of the packet, as described in greater detail below, when the size of the packet is greater than the link MTU of the link to the next hop and when the "don't fragment" (DF) flag of an IP header is set. The DF flag of the IP header indicates that the packet is not to be fragmented. Although this disclosure generally refers to the DF flag as the flag that indicates that the packet is not to be fragmented, other examples may use other methods, such as a different flag or bit, to indicate that the packet is not to be fragmented.

In this manner, the techniques of this disclosure are generally applicable to a packet comprising a header. In some examples, the header indicates that the packet is not to be fragmented, while in other examples, the packet can be fragmented. For instance, in one example, the header indicates that the packet is not to be fragmented. However, the packet may be an echo packet including a minimal size (e.g., no data in the payload). In such an example, source network device 10 may set a value in the header or in a header (e.g., a label) used to encapsulate the packet, the data indicating a link MTU for link 20 of path 26. In particular, source network device 10 may set a value in an outer header to represent the link MTU for link 20. In this example, routers 12 and 14 are configured to update the value of the outer header to represent link MTUs for links 22 and 24, respectively, if the MTUs for links 22, 24 are less than the MTU represented by the outer header. Destination network device 16 may be configured to remove (i.e., "pop") the outer header and set a value of an inner header equal to the MTU indicated by the removed outer header, then send the packet back to source network device 10.

In another example, the header indicates that the packet can be fragmented. Source network device 10 forms the packet to include a maximum amount of data in the packet payload that can be transmitted according to the MTU of link 20. Routers 12 and 14 are configured to fragment the packet if the packet is larger than links 22, 24, respectively. Destination network device 16 may ultimately receive the fragments of the packet and determine which of the fragments is largest. Destination network device 10 adds data to, e.g., an inner header (after popping the outer header), the data being indicative of the MTU size for path 26. The path MTU size in this example corresponds to the size of the largest fragment. Destination network device 10 then sends the packet back to source network device 10. To send the packet back, destination network device 10 may send only the fragment including the indication of the path MTU, all of the packet fragments, or a separate packet including the path MTU indication.

Furthermore, data of the outer header (such as a particular bit of a set of reserved bits) may indicate that the sending network device is configured to support one or more techniques described by this disclosure. That is, in some examples source network device 10 may set a particular bit of the set of reserved bits to a value (e.g., "1") to indicate that the packet is being used to determine the path MTU for path 26, and that a field of the outer header (e.g., a reserved1 field of a GRE header) is to be updated along path 26 to represent the path MTU for path 26. Destination network device 16 may set a value for the particular bit of an inner header to indicate that the field is not to be updated, and set a value for the field indicative of the path MTU for path 26. In some examples, source network device 10 can determine whether all of the network devices along path 26 support the techniques described herein for determining path MTU, and if so the techniques will be applied. In some examples, source network device 10 and destination network device 16 may, during a tunnel establishment phase, negotiate for the use/ support of the techniques described herein for path MTU determination.

In this manner, source network device 10 is able to determine the PMTU of path 26. That is, routers 12, 14 are configured to receive a packet including data indicative of a current MTU for path 26. For example, the data may be included in a field of a header (such as a reserved1 field of an outer GRE header) of the received packet. Additionally or alternatively, the data may correspond to the size of the received packet itself, assuming the packet is a fragment of a larger packet (or can be fragmented). Routers 12, 14 may compare the current MTU to the MTU for a downstream link (e.g., links 22, 24, respectively). When the current MTU is greater than the MTU for the downstream link, routers 12, 14 may send a second packet downstream, where the second packet includes data indicative of the MTU for the downstream link as a new MTU for path 26. For example, routers 12, 14 may modify the value of a reserved1 field of an outer GRE header or fragment the packet such that at least one fragment is the size of the MTU for the corresponding one of links 22, 24. Thus, the "second" packet may correspond to a fragment of the received packet or a modified version of the received packet (in particular, modified data of an outer GRE header of the packet).

Likewise, destination network device 16 may be configured to receive a packet including data indicative of an MTU for path 26. For example, the data may be included in an outer GRE header of the packet or correspond to the size of the packet itself (e.g., where the packet is a fragment of a larger packet). Destination network device 16 may send the data indicative of the MTU for path 26 to source network device 10, which in this example represents an ingress network device of path 26. For example, destination network device 16 may pop the outer GRE header, add the data indicative of the MTU for path 26 to an inner GRE header of the packet, and forward the packet back to source network device 10.

The techniques of this disclosure may thereby overcome certain deficiencies of conventional PMTU determination techniques. That is, conventional implementations of PMTU computation for GRE tunnels use data traffic where the MTU is set to the maximum of the MTU size for the outgoing interface of starting tunnel point and, based on a received ICMP error, the next MTU size is determined and used. This PMTU is periodically aged and the process is repeated to make sure the bandwidth is optimally used. That is, repeating the process ensures that a lesser PMTU value is not used (e.g., in case the PMTU has increased).

These conventional techniques may encounter certain problems. For example, the conventional techniques are dependent on ICMP responses. In some networks, ICMP responses are disabled or suppressed, e.g., by network administrator configuration. In addition, the conventional techniques are a hop-by-hop approach, in which the next MTU chosen as PMTU is determined from an ICMP error for a current hop. This means that in a scenario where there are monotonically decreasing MTU values, the run time to calculate the PMTU is essentially $O(n^2)$, where n represents the number of hops (i.e., network devices) along the path. This could result in data traffic being lost and/or having delay for that period of time.

For example, assume that there are three nodes on a path between a start point of a GRE tunnel and an end point of the GRE tunnel. Assume further that the links between these devices have MTUs as follows: 1400 for the link between the start point and node 1, 1300 between node 1 and node 2, 1200 between node 2 and node 3, and 1100 between node 3 and the end point. In this instance, applying the conventional techniques, the start point would initially send data via node 1 and receive an ICMP error from node 1 indicating an MTU size of 1300. The start point would then send data (in particular, packets of size 1300) via node 1, which would forward the data via node 2, which would return an ICMP error to the start point indicating an MTU size of 1200. The start point would then send data (in particular, packets of size 1200) via node 1, which would forward the packets to node 2, which would forward the packets to node 3. Node 3, however, would send an ICMP error to the start point, via node 2 and node 1, indicating an MTU size of 1100. Ultimately, the start point would determine, in this example, that the PMTU size is 1100. Thus, the process of sending data and receiving an ICMP error could be repeated n times in the worst case scenario, where n represents the number of nodes along the path (e.g., the tunnel). During this time, data packets would either be dropped or delayed.

However, the techniques of this disclosure result in an $O(n)$ process, where n again represents the number of hops along the path, because only a single message is returned to source network device 10 after traversing the devices along the path. That is, source network device 10 sends a packet (e.g., an echo packet) to router 12 including data indicative of an MTU for link 20. Router 12, in turn, forwards the echo packet including data indicative of an MTU for links 20, 22 (e.g., a min of the MTU for links 20, 22). Router 14 likewise forwards the echo packet including data indicative of an MTU for links 20, 22, and 24. Destination network device 16 returns the packet to source network device 10. Again, the data indicative of the MTU may be included in an outer header (e.g., an outer GRE header) of the echo packet and/or correspond to a size of the echo packet itself, as discussed above. In this manner, the techniques of this disclosure may provide certain advantages, such as determination of a PMTU in a manner that is an order of magnitude faster than conventional PMTU determination techniques.

In particular, in one example source network device 10, router 12, router 14, and destination network device 16 may be configured to perform the following process in accordance with the techniques of this disclosure:

a) Source network device 10 selects an echo packet suitable for this technique. The echo will ensure that the packet will return back to source network device 10, which is attempting to determine the PMTU.

b) Source network device 10 creates an echo packet with minimum payload size. Source network device 10 sets certain flags will be set in an outer header of the echo packet, which indicate the nodes on the path (e.g., routers 12, 14 and destination network device 16) to do action in points d, f, and h, as discussed below.

c) Source network device 10 saves the PMTU value in a field of the outer header of the echo packet. Likewise, routers 12, 14 update this field on the path if the flag discussed in b) is set.

d) Routers 12, 14, if the flag discussed in b) is set, check the field value representative of the current PMTU against the egress/outgoing link MTU (that is, the MTU value of the underlying physical interface) of the corresponding one of routers 12, 14. If the egress/outgoing link MTU is less than the field value, routers 12, 14, update the field value to this lesser MTU value.

e) This means that at a node x, the field value when the packet is egressing will have the PMTU value up to that node.

f) After destination network device 16 receives the packet, destination network device 16 pops (i.e., removes) the outer header and checks if the flag discussed in b) is set. If set, destination network device 16 clears the inner header flag and copies the field value representative of the PMTU to the same field of the inner header. Destination network device 16 then returns the packet to source network device 10.

g) On the way back to source network device 10, because the flag of the inner header is explicitly cleared as discussed in point f), the field representative of the PMTU will not be altered. Once the packet reaches the starting point (source network device 10), source network device 10 uses this field to determine the PMTU for path 26.

h) In some examples, this technique is only performed when all devices along path 26 support this technique. For example, during a tunnel established phase, source network device 10 may use the echo packet to check for the applicability of this technique on path 26. The number of nodes on the path and the number of nodes on that path that support (are using) this technique may be computed, and the two numbers may be compared to check if the entire path supports the technique. In particular, devices along path 26 may update (e.g., increment) a value of a header of the echo packet to indicate support for these techniques, and source network device 10 may compare the updated value to a number of devices along the path, and ensure that the updated value indicates that each of the devices along path 26 supports these techniques. Only then, this technique will be used for PMTU computation.

i) For the case where a node's MTU changes after the tunnel establishment, in a transparent way, an ICMP error may be received by source network device 10 if the new PMTU is less than the one being used by this technique. So, when a device receives an ICMP error, the steps in point h) done during the tunnel establishment phase (technique selection phase) may be used to check and re-evaluate if the technique is still applicable on that path. If it is not applicable, then use of this technique may be discontinued by source network device 10 and instead, the conventional PMTU technique may be used.

j) For the technique in which intermediate devices update the header to reflect the MTU of the intermediate device's egress link, the intermediate devices that do not support the technique will not take action based on the hint. So the PMTU discovered will be for the devices supporting this technique. Thus, in a hybrid environment, this can also be used as traditional techniques will take care of discovering the final PMTU value.

k) This algorithm/technique is not limited to tunnels, such as GRE tunnels. These techniques may be used to make PMTU computations for any path where a suitable packet, which can be an echo packet or a set of packets, can be sent from start to end point and vice-versa of the path, where the packets can be correlated together and provide for the provision of the field/flag in b) and c).

In another example, the following process may be used in accordance with the techniques of this disclosure:

a) Source network device 10 selects an echo packet suitable for this technique. The echo will ensure that the packet will return back to source network device 10, which is attempting to determine the PMTU.

b) Source network device 10 constructs the echo packet to have a payload size equal to the egress/outgoing link MTU value (that is, the MTU value of the underlying physical interface coupled to link 20). Source network device 10 also sets values of certain flags in an outer header of the echo packet to indicate to destination network device 16 that the echo packet is to be returned with a value indicative of the PMTU for path 26. Furthermore, source network device 10 may clear the "don't fragment" (DF) bit of the outer IP header of the echo packet.

c) Source network device 10 sets a value of a field of the outer header to indicate the current PMTU, e.g., equal to the MTU of link 20. This step is not necessarily performed in all cases, however, as the payload size of the packet may indicate the current PMTU, in some examples. When this step is performed, source network device 10 also sets a value of a flag to indicate that this field is to be updated by, e.g., routers 12, 14, as discussed below.

d) Routers 12, 14 determine whether the packet is larger than the MTUs of an outbound link along path 26, e.g., links 22, 24, respectively.

e) If the packet is larger than the MTU of the outbound link, routers 12, 14 fragment the packet, based on the value of the DF flag. In particular, routers 12, 14 fragment the packet such that at least one fragment has the size of the MTU for the link to the next hop. Also, in some examples, routers 12, 14 update the value of the field representative of the current PMTU in the outer header of the fragments. However, again, this step is optional.

f) Destination network device 16 receives the fragments and. In response to receiving the fragments, destination network device 16 pops the outer header and checks the flags to determine whether the flag indicating that the packet is to be returned to source network device 10 with data indicating the PMTU. If this flag indicates that the packet is to be returned, destination network device 16 sets the value of a field in an inner header to indicate the size of the PMTU, clears the corresponding flag (to prevent the field value from being modified), and returns the packet to source network device 10. When setting the value of the field, destination network device 16 may set the value based on either or both of a value of the field of the outer header and/or the size of a largest received fragment for the packet.

g) Routers 12, 14 do not modify the data of the inner header indicative of the PMTU, based on the value of the flag. Once the packet reaches source network device 10, source network device 10 determines the PMTU based on the value of the field in the inner header of the packet (or, in some examples, the size of the received fragment).

h) Source network device 10 and destination network device 16 may negotiate for the use/support of this technique during the tunnel establishment phase.

i) This process is not limited to use with tunnels, e.g., GRE tunnels. PMTU computations for any IPv4 path where a suitable packet can be identified that can be an echo packet or a set of packets from start to end point devices and vice versa that can be correlated together, and provide for the provision of the field/flag discussed in steps b) and c) can use this process.

Figure 2:
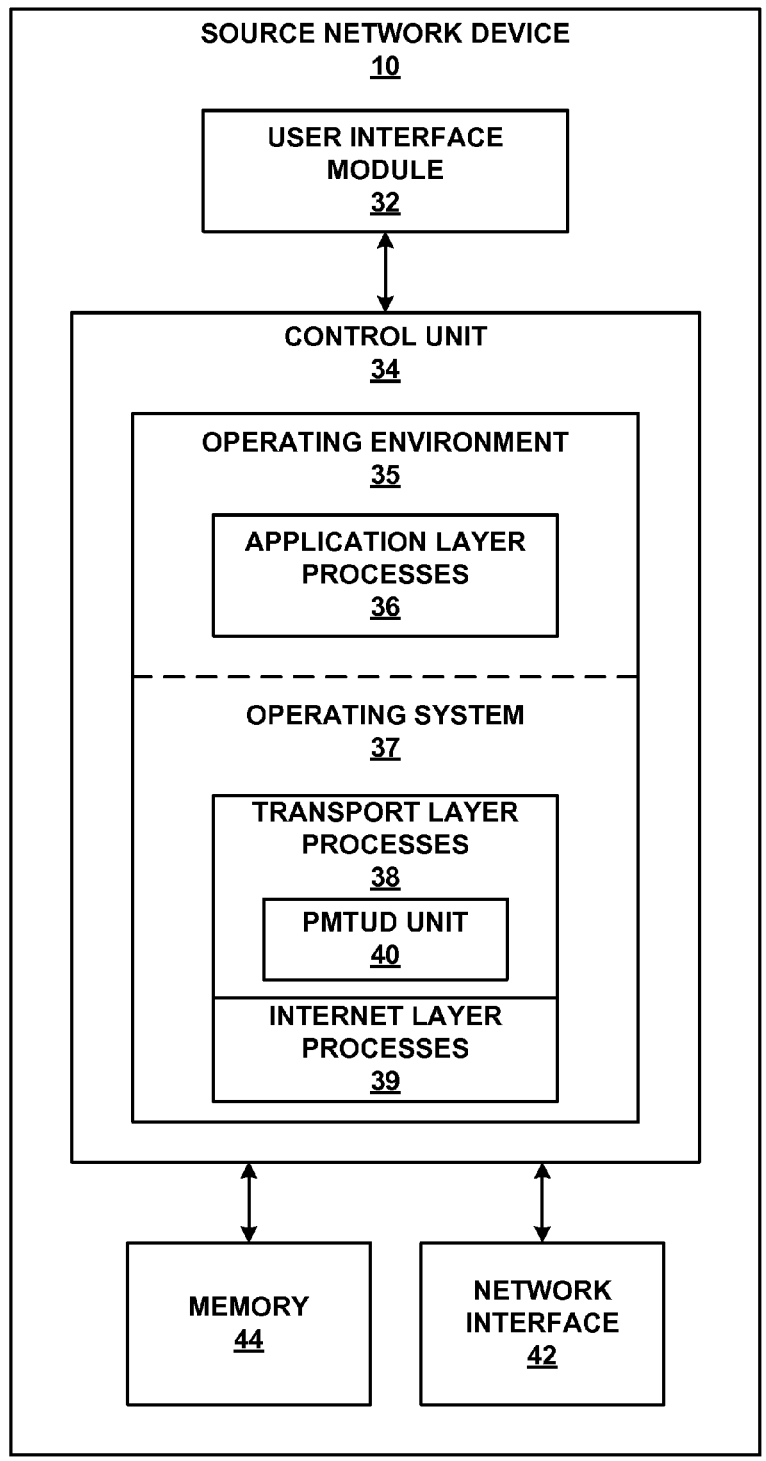
FIG. 2 is a block diagram illustrating an example arrangement of components of a source network device that calculates a PMTU for a network path.

FIG. 2 is a block diagram illustrating an example arrangement of components of source network device 10 that calculates a PMTU for a network path. Other network devices similar to source network device 10, such as any intermediate or endpoint network device as described above with respect to FIG. 1, may include the features described with respect to source network device 10 of FIG. 2. For example, source network device 10 may comprise a computing device, a workstation device, a laptop computer, a desktop computer, a server, a printer, a personal digital assistant (PDA), a cellular phone or smart phone, a router, a gateway, a hub, a bridge, a switch, an intrusion detection and prevention device, or other network device. Source network device 10 is generally described as comprising an endpoint device, such as a computing device or server, for the purpose of explanation.

In the example of FIG. 2, source network device 10 comprises user interface module 32, control unit 34, and network interface 42. User interface module 32 causes one or more user interface devices, such as a display, a keyboard, a mouse, a touchscreen, a stylus, a light pen, a microphone, a speaker, or other user interface device of source network device 10 to receive and/or present data from or to a user. For example, user interface module 32 may receive a request from a user to initiate a network session with destination network device 16 (FIG. 1). The request may comprise a request to access a web page of destination network device 16, for example, when destination network device 16 comprises a web server.

Network interface 42 comprises an interface by which source network device 10 communicates with devices of network 18 (FIG. 1), e.g., router 12. Network interface 42 may comprise one or more of a network interface card (NIC), an Ethernet interface, a Gigabit Ethernet interface, a wireless card, a cable modem, a satellite modem, a telephone modem, a DSL modem, or other network interface. Network interface 42 also supports a maximum transmission unit size. In some examples, source network device 10 comprises a plurality of network interfaces, which may each support different MTUs based on the interfaces themselves, links to which the interfaces are connected, and network devices on the other end of these links.

Control unit 34, in one example, comprises hardware for performing one or more of the techniques of this disclosure. In some examples, control unit 34 comprises hardware for executing instructions encoded in memory 44. For example, control unit 34 may comprise one or more processors, one or more microprocessors, digital signal processors (DSPs), application specific integrated circuits (ASICs), field programmable gate arrays (FPGAs), or any other equivalent integrated or discrete logic circuitry, or any combination thereof.

Memory 44 may comprise one or more computer-readable storage media for encoding instructions that cause a processor to perform various procedures or functions. For example, memory 44 may comprise one or more of a hard disk, an optical medium such as a CD-ROM, a floppy disk, a flash drive, a solid state drive, or other magnetic, optical, or flash medium. Memory 44 may be encoded with instructions corresponding to application layer processes 36, transport layer processes 38, Internet layer processes 39, and PMTUD unit 40. Control unit 34, in some examples, retrieves and executes the instructions from memory 44 for these modules. In some examples, any or all of application layer processes 36, transport layer processes 38, Internet layer processes 39, and PMTUD unit 40 may comprise independent hardware modules that perform the functions attributed thereto. In some examples, control unit 34 also executes instructions for user interface module 32 and/or network interface 42.

In the example of FIG. 2, control unit 34 comprises operating environment 35 and operating system 37. Operating system 37 corresponds to any operating system for an endpoint network device, such as Juniper Junos, Microsoft Windows, Linux, Unix, Solaris, FreeBSD, or other operating system. In the example of FIG. 2, operating system 37 provides transport layer processes 38, Internet layer processes 39, and PMTUD (PMTU discovery) unit 40. Transport layer processes 38 and Internet layer processes 39 comprise implementations of one or more network protocols, such as TCP/IP, the user datagram protocol (UDP), the point-to-point protocol (PPP), generic routing encapsulation (GRE), and/or other transportation and Internet layer communication protocols.

In the example of FIG. 2, PMTUD unit 40 is implemented by operating system 37 within transport layer processes 38. Although depicted as operating at the transport layer, PMTUD unit 40 may in some example implementations operate at both the transport layer and the Internet layer, or elsewhere in the network stack. In other examples, PMTUD unit 40 may be included in a line card itself, such as a removable line card of source network device 10.

Operating environment 35 comprises an environment for processes executing above operating system 37 that interact with services provided by operating system 37. The processes executing in operating environment 35 comprise application layer processes 36, which generally correspond to particular applications of source network device 10. Application layer processes 36 may include, for example, a web browser, an e-mail client, a file transfer program, or other modules for performing various tasks associated with source network device 10.

PMTUD unit 40 represents an example implementation of the techniques of this disclosure for discovering a PMTU for a network path. PMTUD unit 40, in one example, sets a value of a flag of an outer GRE header of an echo packet (e.g., a bit of a reserved0 field) to indicate that another field (e.g., the reserved1 field) indicates a value of a current PMTU for the network path, and that the value of the field is to be updated to a current PMTU by intermediate network devices between source network device 10 and destination network device 16 (FIG. 1). In this example, PMTUD unit 40 sets the value of the field based on, e.g., the MTU associated with network interface 42. In particular, PMTUD unit 40 constructs the packet to include an inner header (e.g., an inner GRE header) and an outer header (e.g., an outer GRE header). Initially, PMTUD unit 40 may set the values of the flag and the field of the outer header to perform these techniques.

PMTUD unit 40 is also configured to receive the packet back from, e.g., destination network device 16. The received packet may include just the inner header, which includes a value in the field (e.g., the reserved1 field) indicative of the PMTU for path 26 (FIG. 1) between source network device 10 and destination network device 16. Thus, PMTUD unit 40 may determine that the PMTU for path 26 is equal to the value of the reserved1 field of the inner GRE header of the echo packet received from destination network device 16.

As discussed above, and also with respect to FIG. 3, intermediate network devices of the path (e.g., routers 12, 14) may be configured in various ways. In one example, routers 12, 14 are configured to update the value of the field in the outer GRE header according to MTUs of outgoing links along path 26. In another example, routers 12, 14 need not update (or may be configured not to update) the value of the field in the outer header, but may be configured to fragment the packet when the packet is larger than the MTU of the outgoing link along path 26. Thus, in some examples, PMTUD unit 40 sets the DF flag to a value indicating that the packet can be fragmented. Also, in examples where fragmentation is used, PMTUD unit 40 constructs the packet to have a payload size equal to the MTU of network interface 42, whereas in examples where fragmentation is not used, PMTUD unit 40 constructs the packet to have a minimal sized payload.

Destination network device 16 may include components that are substantially similar to those discussed with respect to source network device 10 of FIG. 2. However, the PMTUD unit of destination network device 16 may be configured to operate in a slightly different manner than source network device 10, because destination network device 16 operates as an egress network device of a path. In particular, the PMTUD unit of destination network device 16 may be configured to pop the outer GRE header from a received packet. In some examples, the PMTUD unit of destination network device 16 copies the value of the field (e.g., the reserved1 field) of representative of the PMTU for path 26 of the outer header to the same field of the inner header and returns the packet to source network device 10. In other examples, the PMTUD unit of destination network device 16 pops the outer header and sets the value of the field indicative of the PMTU for path 26 of the inner header to represent the size of a largest received fragment of an echo packet, reassembles the packet from the received fragments, and returns the reassembled packet to source network device 10. In either case, the PMTUD unit of destination network device 16 may set a value of a flag of the inner packet to indicate that the value of the field (e.g., the reserved1 field) is not to be altered.

In this manner, destination network device 16 represents an example of an egress network device for a network path including one or more network interfaces configured to send packets to an upstream network device of the network path and to receive packets from the upstream network device, and a processing unit configured to receive, via the one or more network interfaces, a first packet including data indicative of a maximum transmission unit (MTU) for the network path, form, from the first packet, a second packet to include a path header corresponding to the network path such that the path header includes the data indicative of the MTU for the network path, and send, via the one or more network interfaces and the upstream network device, the second packet to an ingress network device of the network path.

Ultimately, source network device 10 receives the packet sent by destination network device 16 that includes data representative of the PMTU for path 26. Data representative of the PMTU may be stored, e.g., within memory 44, PMTUD unit 40, or elsewhere, and referenced when constructing packets to be sent via path 26. In particular, source network device 10 may ensure that packets to be sent via path 26 do not include data in excess of the calculated PMTU for path 26.

Figure 3:
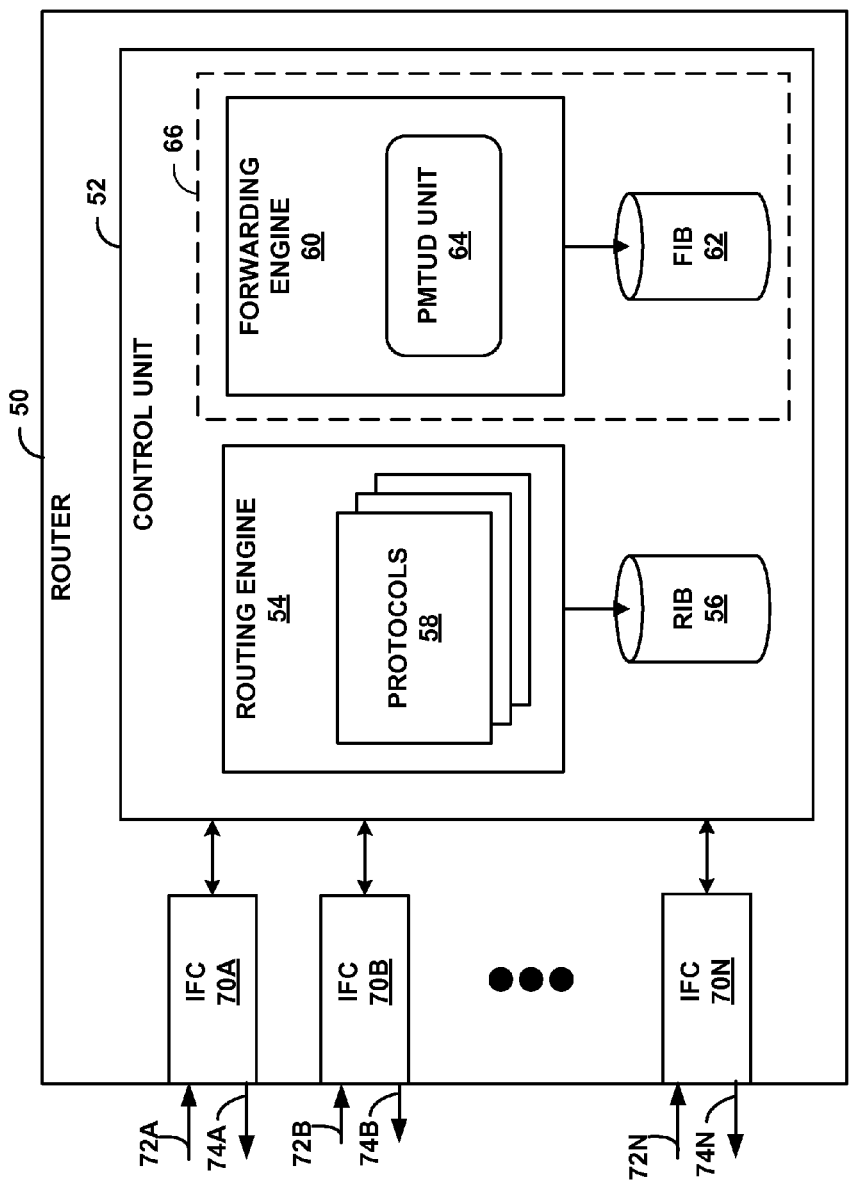
FIG. 3 is a block diagram illustrating an example router that is intermediate to a source device and a destination device and is configured to participate in the calculation of a PMTU.

FIG. 3 is a block diagram illustrating an example router 50 that is intermediate to a source device and a destination device and is configured to participate in the calculation of a PMTU. Router 50 may correspond to either of routers 12 or 14 (FIG. 1). In some examples, router 50 may correspond to an ingress network device to a network path, or an egress network device to a network path, such as source network device 10 or destination network device 16 (FIG. 1). In the example of FIG. 3, router 50 includes interface cards 70A-70N (IFCs 70) and control unit 52. Each of interface cards 70 includes a corresponding set of one of input links 72A-72N (input links 72) and one of output links 74A-74N (output links 74). For example, interface card 70A includes input link 72A and output link 74A. Router 50 receives packets through one of input links 72 and forwards packets intended for another destination out one of links 74. Router 50 may also receive packets intended for itself, e.g., packets from other routers in the network comprising routing information. Routing engine 54 may use data from packets intended for router 50 to calculate routes through the network and store the routes in routing information base 56 according to one or more of protocols 58.

Control unit 52 comprises routing engine 54, forwarding engine 60, routing information base (RIB) 56, and forwarding information base (FIB) 62. In other examples, a router may comprise distinct control units for the routing engine and the forwarding engine, or the forwarding engine and the routing engine may be distributed within each of the IFCs. Control unit 52 may comprise one or more processors, microprocessors, DSPs, FPGAs, ASICs, or other circuitry or hardware for executing, e.g., routing engine 54.

Routing engine 54 comprises protocols 58 that comprise implementations of one or more routing protocols, such as open shortest path first (OSPF), intermediate system to intermediate system (IS-IS), border gateway protocol (BGP), routing information protocol (RIP), interior gateway routing protocol (IGRP), exterior gateway protocol (EGP), or other routing protocols for calculating routes through a network. Routing engine 54 stores calculated routes in RIB 56.

Forwarding engine 60 receives packets from IFCs 70 and forwards the packets through IFCs 70 according to forwarding information stored in FIB 62. FIB 62 generally includes forwarding information corresponding to one or more routes stored in RIB 56. Whereas routes stored in RIB 56 comprise routes throughout a network, e.g., routes from one endpoint to another endpoint, FIB 62 stores data comprising, for example, a lookup table that correlates destinations of packets with one of IFCs 70. In this manner, forwarding engine 60, upon receiving a packet, may identify a destination of the packet and determine one of IFCs 70 through which to forward the packet by performing a lookup in FIB 62.

In the example of FIG. 3, forwarding logic within forwarding engine 60 has been modified to include PMTUD unit 64. Instructions for PMTUD unit 64 may be stored in a memory or other computer-readable storage medium (not shown) of router 50 and executed by control unit 52. Alternatively, PMTUD unit 64 may be embodied within hardware, such as one or more ASICs or one or more of IFCs 70, that performs the functions described with respect to PMTUD unit 64. In other examples, any combination of hardware, software, and firmware may be used to perform the functions described with respect to PMTUD unit 64.

PMTUD unit 64 modifies certain received packets in accordance with the techniques of this disclosure. For example, a received packet may include an outer header (such as an outer GRE header) and an inner header (e.g., an inner GRE header). The outer header may include a field indicative of a current PMTU for a path and a flag indicative of whether the field is to be updated. Forwarding engine 60 determines one of IFCs 70 via which the packet is to be sent, and PMTUD unit 64 determines an MTU for the one of outbound links 74 corresponding to the determined to the determined one of IFCs 70.

In one example, PMTUD unit 64 determines whether the value of the field of the outer header of the packet is larger than the MTU of the determined one of outbound links 74. If the value of the field is larger, and the value of the flag indicates that the field is to be updated, PMTUD unit 64 updates the value of the field in the outer header of the packet to represent the MTU of the determined one of outbound links 74. Forwarding engine 60 then forwards the packet via the determined one of IFCs 70. The packet may be said to be a second, different packet, because data of the packet (specifically, the outer header) has been modified.

In another example, PMTUD unit 64 determines whether the packet can be fragmented (e.g., based on a DF flag of an IP header of the packet), as well as whether the packet is larger than the MTU for the determined one of outbound links 74. If the packet is larger and the packet can be fragmented, PMTUD unit 64 (or a dedicated fragmentation unit, not shown) fragments the packet such that at least one fragment is equal to the MTU of the determined one of outbound links 74. In some examples, PMTUD unit 64 also sets the value of the field of the outer header for each of the fragments to represent the current MTU for the path as discussed above. Forwarding engine 60 then forwards the fragments of the packet via the determined one of IFCs 70.

In this manner, router 50 represents an example of an intermediate network device of a network path (e.g., a network tunnel) including one or more network interfaces (e.g., IFCs 70) configured to receive packets from an upstream network device of the network path and to send packets to a downstream network device of the network path. Router 50 also includes a processing unit (e.g., control unit 52, including forwarding engine 60 and PMTUD unit 64) configured to receive a first packet including data indicative of a current maximum transmission unit (MTU) for the network path via the one or more network interfaces from the upstream network device, determine whether the current MTU for the network path is greater than an MTU for a network interface of the network interfaces that is coupled to the downstream network device, and, when the current MTU is greater than the MTU for the network interface, send a second packet to the downstream network device via the network interface coupled to the downstream network device, the second packet including data indicative of the MTU for the network interface as a new MTU for the network path.

Figure 4:
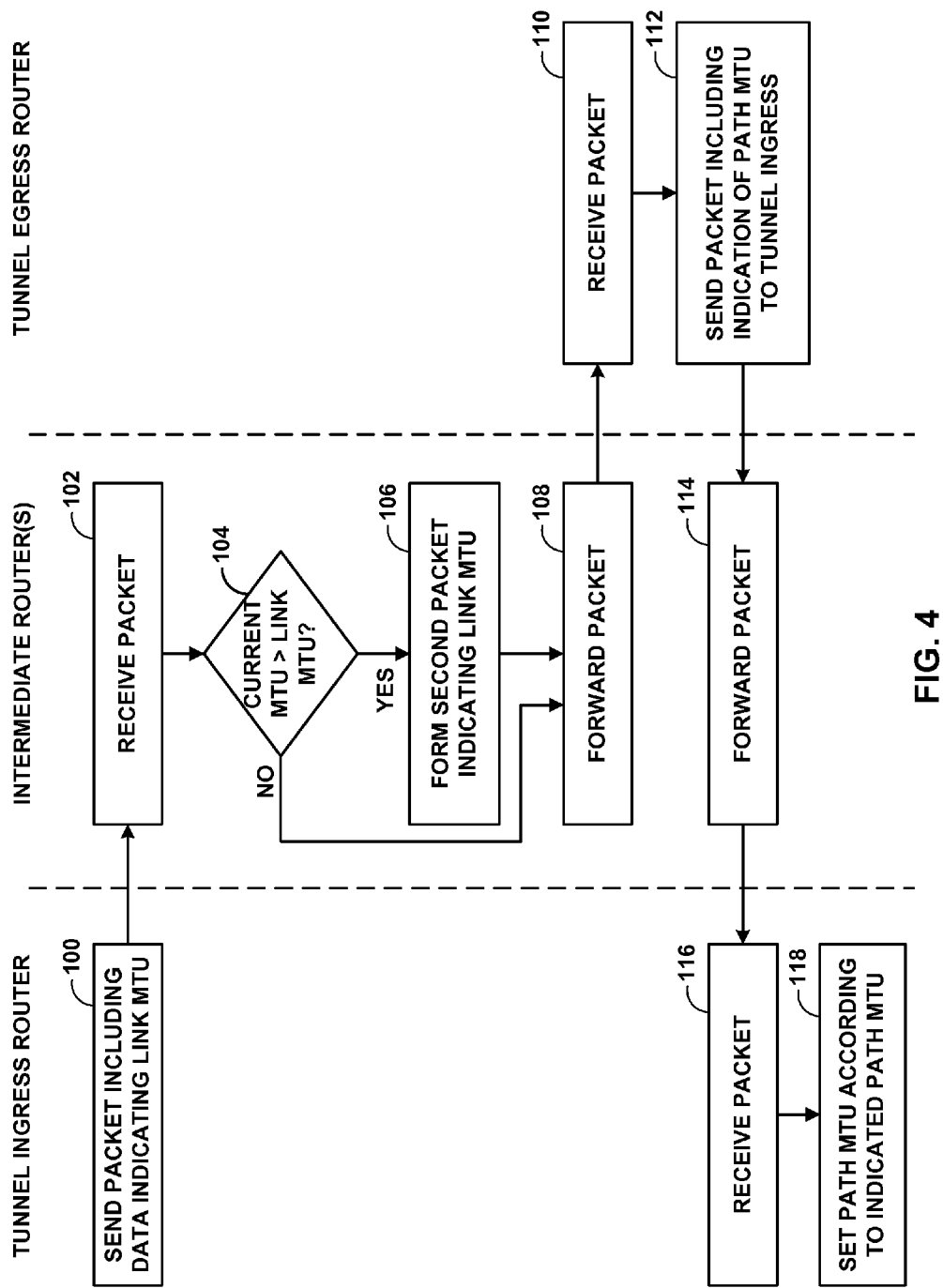
FIG. 4 is a flowchart illustrating an example method for calculating a PMTU in accordance with the techniques of this disclosure.

FIG. 4 is a flowchart illustrating an example method for calculating an MTU of a network path in accordance with the techniques of this disclosure. FIG. 4 depicts three types of devices that participate in this example method: a tunnel ingress router, intermediate routers, and a tunnel egress router. The tunnel ingress router may correspond to source network device 10 (FIG. 1), the intermediate routers may correspond to either of routers 12, 14 (FIG. 1), and the tunnel egress router may correspond to destination network device 16 (FIG. 1).

Initially, the tunnel ingress router sends a packet to an intermediate router, destined to ultimately reach the tunnel egress router, as a first packet including data indicating a link maximum transmission unit (MTU) (100). Although not shown in FIG. 4, it should be understood that this packet may further include data indicating that this packet includes data indicating the MTU, and that this packet is to be used for PMTU determination. In one example, the data indicative of the MTU is included in an outer header of the packet, while in another example, the data indicative of the MTU is the size of the packet itself. The intermediate router receives the packet (102) and determines whether the current MTU indicated by the data of the packet is larger than the outbound link MTU (104). Likewise, as noted above, the intermediate router(s) may determine whether the received packet includes the data indicating that this packet is to be used for PMTU determination.

If the indicated MTU of the packet is larger than the MTU of the outbound link ("YES" branch of 106), the intermediate router forms a second packet including data indicative of the outbound link MTU (106) and forwards the second packet (108). To form the second packet, the intermediate router may fragment the received packet or modify the value in the outer header representative of the path MTU. If the indicated MTU of the packet is not larger than the MTU of the outbound link ("NO" branch of 104), the intermediate router may simply forward the received packet (108). The intermediate router may forward the packet to another intermediate router along the network tunnel or to the tunnel egress router.

Ultimately, the tunnel egress router receives a packet (110) including data indicative of the path MTU. For example, the data may be included in an outer header of the packet or be represented by the size of the packet itself. In either case, the tunnel egress router sends a packet including an indication of the path MTU to the tunnel ingress router (112). For example, the tunnel egress router may pop (i.e., remove) an outer header of the packet, modify a value of a field of an inner header of the packet to represent the path MTU, and then forward the packet to the tunnel ingress router via the intermediate routers. In addition, the tunnel egress router may set a value for a flag of the inner header indicating that the field representative of the path MTU is not to be modified. Furthermore, the tunnel egress router may set a value for a flag or other data of the packet (e.g., of the inner header) indicating that this packet is used for path MTU determination.

Accordingly, the intermediate routers receive and forward the packet (114). Ultimately, the tunnel ingress router receives the packet (116) and sets the path MTU according to the indicated path MTU (118), e.g., based on the value of the field of the inner header as set by the tunnel egress router.

In this manner, the method of FIG. 4 represents an example of a method including, by an egress network device of a network path: receiving a first packet including data indicative of a maximum transmission unit (MTU) for the network path, forming, from the first packet, a second packet to include a path header corresponding to the network path such that the path header includes the data indicative of the MTU for the network path, and sending the second packet to an ingress network device of the network path.

Likewise, the method of FIG. 4 represents an example of a method including, by an intermediate network device of a network path: receiving a first packet including data indicative of a current maximum transmission unit (MTU) for the network path, determining whether the current MTU for the network path is greater than an MTU for a network interface of the intermediate network device that is coupled to a downstream network device of the network path, and, when the current MTU is greater than the MTU for the network interface, sending a second packet to the downstream network device, the second packet including data indicative of the MTU for the network interface as a new MTU for the network path.

Figure 5:
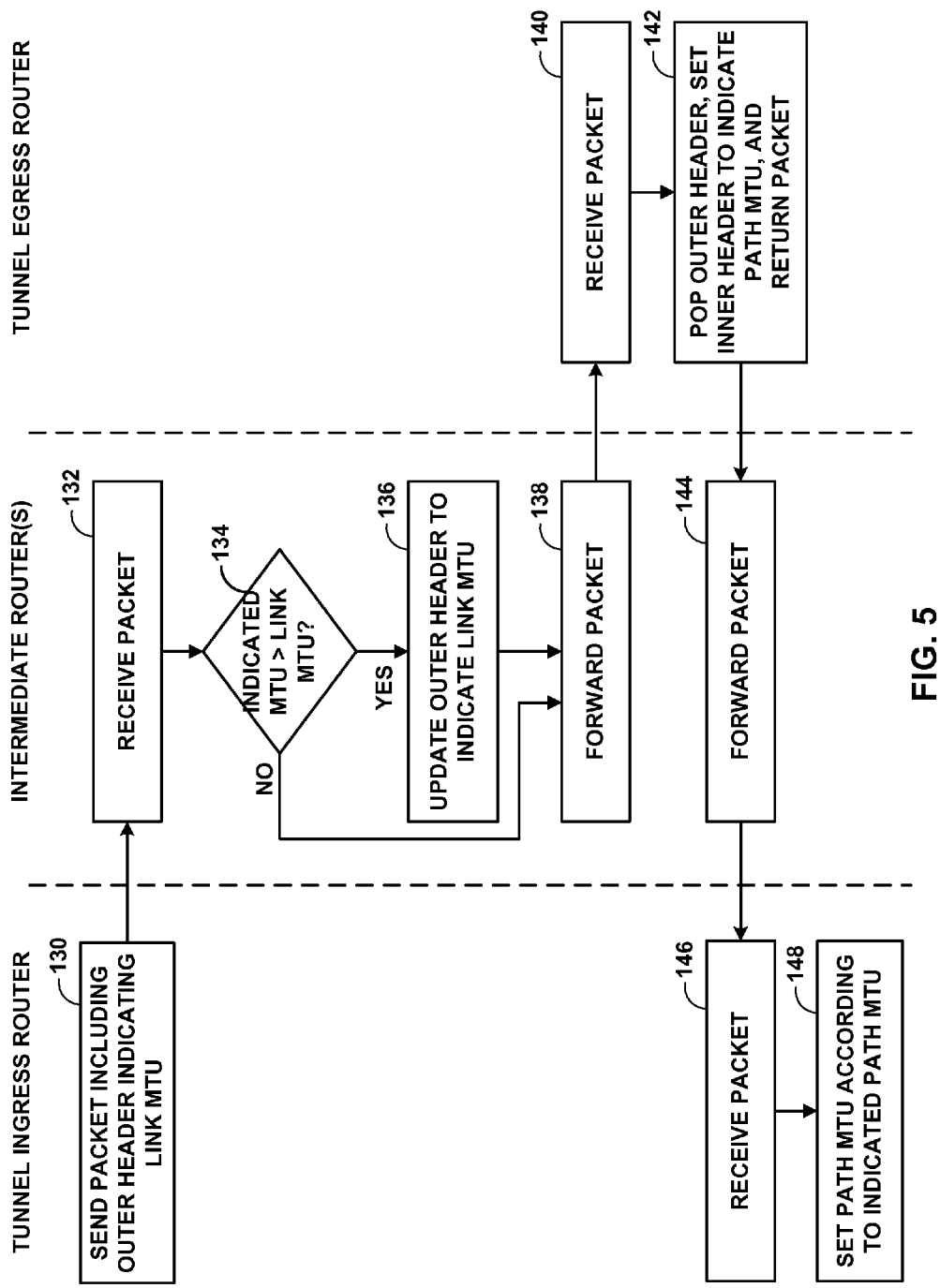
FIG. 5 is a flowchart illustrating an example method in accordance with the techniques of this disclosure for determining a PMTU.

FIG. 5 is a flowchart illustrating an example method in accordance with the techniques of this disclosure for determining a path MTU. FIG. 5 represents a more particular implementation of the method of FIG. 4. Like FIG. 4, FIG. 5 depicts three types of devices that participate in this example method: a tunnel ingress router, intermediate router(s), and a tunnel egress router. The tunnel ingress router may correspond to source network device 10 (FIG. 1), the intermediate routers may correspond to either of routers 12, 14 (FIG. 1), and the tunnel egress router may correspond to destination network device 16 (FIG. 1).

Initially, the tunnel ingress router forms an echo packet including a payload of minimum size, encapsulated by an inner header (e.g., an inner GRE header) and an outer header (e.g., an outer GRE header). In particular, the tunnel ingress router sets the value of a field of the outer header to indicate an MTU for a link along the tunnel. As discussed above, this packet may further include data indicating that this packet includes data indicating the MTU, and that this packet is to be used for PMTU determination. The tunnel ingress router then sends the packet (including the outer header indicating the link MTU) to an intermediate router along the tunnel (130).

The intermediate router receives the packet (132). In some examples, the intermediate router(s) determine whether the received packet includes the data indicating that this packet is to be used for PMTU determination. The intermediate router then determines whether the indicated MTU is greater than the MTU size for the outbound link along the tunnel (134). If the indicated MTU is greater ("YES" branch of 134), the intermediate router updates the outer header to indicate the link MTU (136) and forwards the packet (138). However, if the indicated MTU is not greater ("NO" branch of 134), the intermediate router simply forwards the packet as received (138). The intermediate router may forward the packet to another intermediate router along the tunnel or to the tunnel egress router.

The tunnel egress router ultimately receives the packet (140). The tunnel egress router then pops the outer header, sets the inner header to be the same as the value of the field from the outer header indicative of the path MTU, and returns the packet to the tunnel ingress router (142). In particular, the tunnel egress router forwards the packet back to the intermediate routers, which ultimately forward the packet (144) to the tunnel ingress router. Furthermore, the tunnel egress router may set a value for a flag or other data of the packet (e.g., of the inner header) indicating that this packet is used for path MTU determination. The tunnel ingress router receives the packet (146) and sets the path MTU according to the indicated path MTU (148), i.e., the MTU indicated by the inner header.

Figure 6:
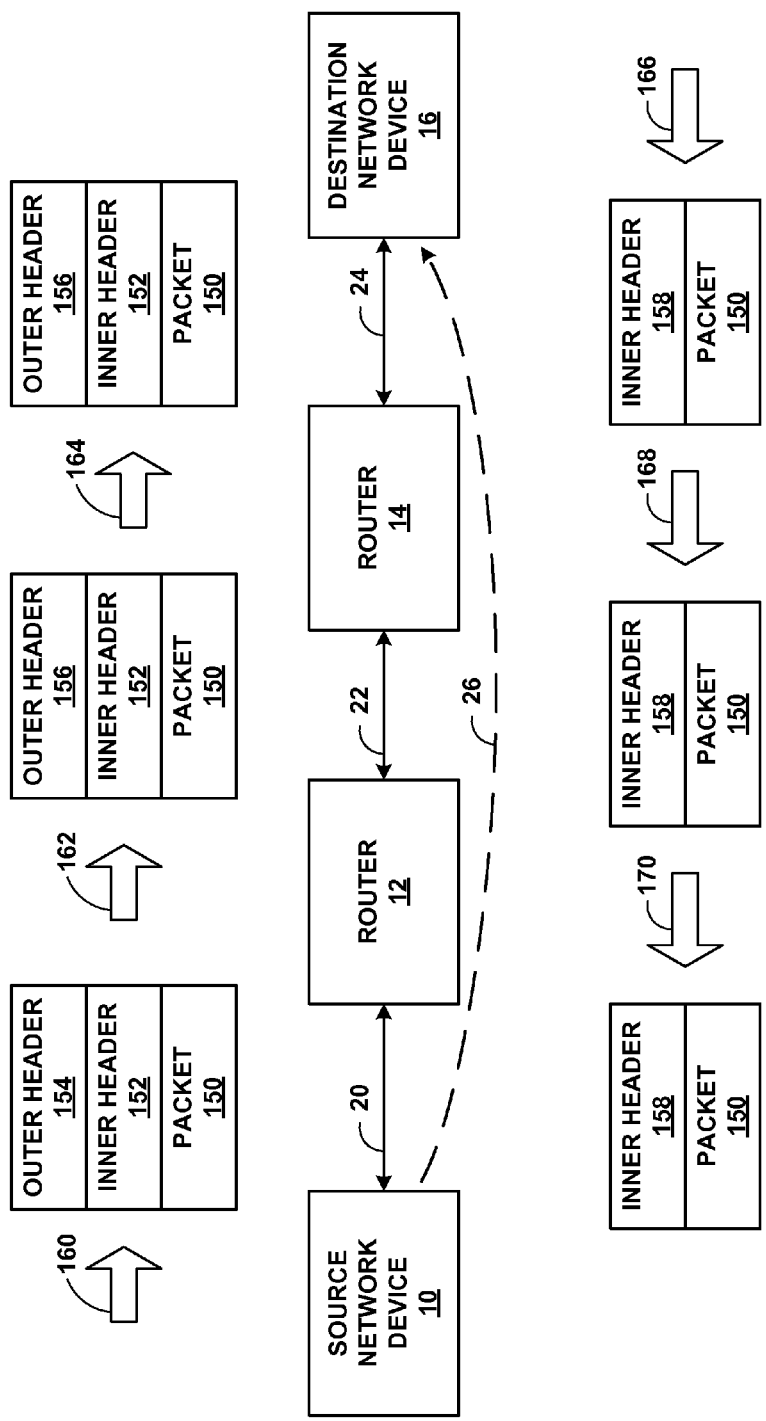
FIG. 6 is a conceptual diagram illustrating packets exchanged between the devices of FIG. 1 according to the example method of FIG. 5.

FIG. 6 is a conceptual diagram illustrating packets exchanged between the devices of FIG. 1 according to the example method of FIG. 5. This process may be performed during a tunnel establishment phase of, e.g., GRE (which may include a PMTU technique selection phase), and/or periodically during a communication session. Initially, source network device 10 forms an packet 150 encapsulated by inner header 152 and outer header 154. Inner header 152 and outer header 154 may comprise GRE headers. This entire structure may also generally be referred to as a "packet." In accordance with the techniques of this disclosure, source network device 10 may form outer header 154 to include data indicating an MTU of link 20, and also a flag with a value indicating that the data indicating the MTU is to be updated by, e.g., routers 12, 14, and destination network device 16. Source network device 10 then forwards the packet (i.e., packet 150 encapsulated by inner header 152 and outer header 154) to router 12 via link 20 (160).

For purposes of example, it is assumed that the MTU of link 22 is lower than the MTU of link 20, and that the MTU of link 24 is greater than at least the MTU of link 22. Thus, after receiving the packet from source network device 10, router 12 determines whether the MTU of link 22 (which is along path 26, as indicated by, e.g., data of a FIB maintained by router 12) is less than the MTU indicated by the data of outer header 154. More particularly, router 12 may first determine the value of the flag noted above, and when the flag indicates that the data of outer header 154 is to be updated, router 12 then determines whether the MTU of link 22 is greater than the MTU indicated by the data of outer header 154. Based on the assumption stated above that the MTU of link 22 is less than the MTU indicated by outer header 154, router 12 effectively forms a new packet by updating the data of outer header 154 to reflect the MTU of link 22, thereby forming outer header 156. Inner header 152 and packet 150 remain unchanged. Router 12 then forwards the packet (i.e., packet 150, encapsulated by inner header 152 and outer header 156) to router 14 via link 22 (162).

Router 14, similarly, checks the flag of outer header 156 after receiving the packet. In this example, the flag indicates that the value of the MTU of outer header 156 is to be updated. Thus, router 14 (like router 12) determines whether the MTU indicated by the data of outer header 156 is greater than the MTU of link 24. In this example, it is assumed that the MTU of link 24 is greater than the MTU of link 22, and therefore, router 14 determines that the MTU indicated by the data of outer header 156 is not greater than the MTU of link 24. Accordingly, router 14 forwards the packet to destination network device 16 without modifying data of the packet (in particular, data of outer header 156) (164).

Destination network device 16 thereby receives the packet, including outer header 156. Destination network device 16 pops outer header 156 and copies the value of the data indicative of the MTU from outer header 156 to a corresponding field of inner header 152 (thereby forming inner header 158). Furthermore, destination network device 16 changes the value of the flag to indicate that the value of the MTU indicated by the data of inner header 158 is not to be updated, e.g., by routers 12 and 14. Destination network device 16 then forwards the packet (i.e., packet 150 encapsulated by inner header 158) to router 14 (166).

Router 14 receives the packet from destination network device 16. Because the flag indicates that the MTU data of inner header 158 is not to be updated, router 14 simply forwards the packet to router 12 via link 22 (168). Similarly, router 12 simply forwards the packet to source network device 10 (170). Source network device 10 retrieves data from inner header 158 representative of the MTU and establishes a path MTU for path 26 (e.g., a GRE tunnel) based on this data.

Figure 7A:
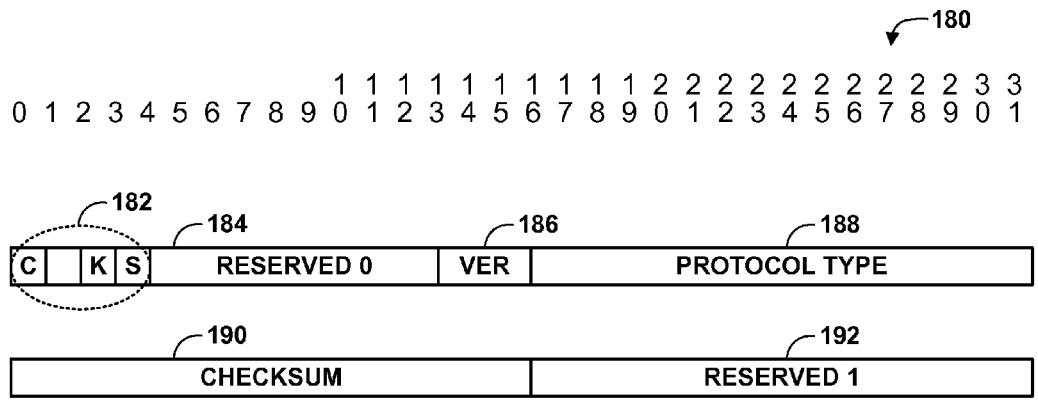
FIGS. 7A and 7B are conceptual diagrams illustrative of GRE headers in accordance with one example of the techniques of this disclosure.
Figure 7B:
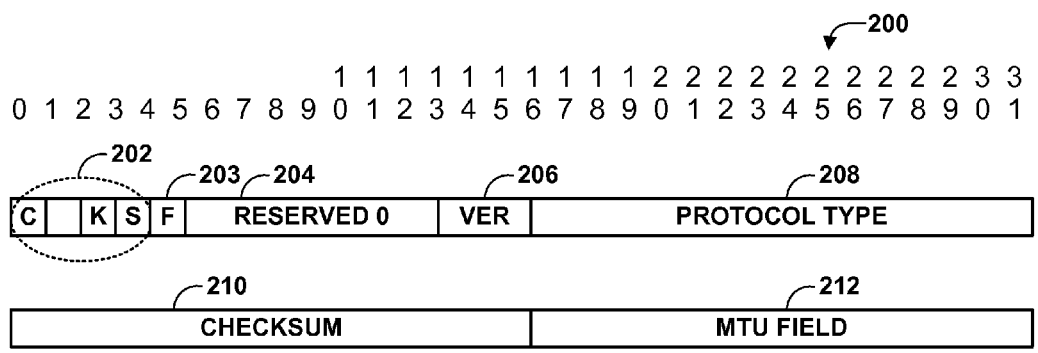

FIGS. 7A and 7B are conceptual diagrams illustrative of GRE headers in accordance with one example of the techniques of this disclosure. FIG. 7A illustrates GRE header 180, which includes a set of bits 182 (including a checksum (C) present bit, a key bit, and a sequence number bit), reserved 0 field 184, version field 186, protocol type field 188, checksum 190, and reserved 1 field 192. The checksum present bit of bits 182 indicates whether checksum field 190 and reserved 1 field 192 are included in GRE header 180 when used to encapsulate a packet. In accordance with the techniques of this disclosure, the checksum present bit of bits 182 has a value (e.g., 1) that indicates that checksum field 190 and reserved 1 field 192 are present, as explained below. The key bit and the sequence number bits of bits 182 generally indicate whether a key value and a sequence number value, respectively, are included in GRE header 180 (although not shown in FIG. 7A). These values are described in Dommety, "Key and Sequence Number Extensions to GRE," Network Working Group, RFC 2890, available at tools.ietf.org/html/rfc2890, incorporated herein by reference.

Version field 186 includes a value of zero in accordance with RFC 2784. Protocol type field 188 includes a value indicative of a protocol for a payload of a packet encapsulated by GRE header 180. In some examples, protocol type field 188 includes a value indicating that the encapsulated packet represents an IP packet, e.g., according to IPv4, described in Information Sciences Institute, "INTERNET PROTOCOL," RFC 791, September 1981, available at tools.ietf.org/html/rfc791.

Reserved 0 field 184 and reserved 1 field 192 generally include data reserved for future use. However, some or all bits of reserved 1 field 192 may be used to indicate a path MTU in accordance with the techniques of this disclosure. Likewise, one or more bits of reserved 0 field 184 may be used as a flag indicative of whether reserved 1 field 192 includes data indicative of a path MTU, and/or if that value should be updated (e.g., by intermediate nodes along the path, such as routers 12, 14 of FIG. 1).

FIG. 7B illustrates GRE header 200 in accordance with the techniques of this disclosure. In general, the fields of GRE header 200 that are similarly named to those of GRE header 180 of FIG. 7A have similar purposes. That is, bits 202 are substantially similar to bits 182, reserved 0 field 204 is substantially similar to reserved field 184 (except in number of bits), version field 206 is substantially similar to version field 186, protocol type field 208 is substantially similar to protocol type field 188, and checksum field 210 is substantially similar to checksum field 190.

However, GRE header 200 includes flag 203 and MTU field 212. Flag 203 in this example corresponds to an ordinal first bit of reserved field 204 (FIG. 7A), although in other examples, additional and/or alternative bits of reserved field 0 184 may be used for the purpose of flag 203. In general, the value of flag 203 indicates whether MTU field 212 includes a value representative of a path MTU for a GRE tunnel corresponding to GRE header 200, and whether the value of MTU field 212 should be updated. Likewise, assuming the value of flag 203 indicates that MTU field 212 includes a path MTU value, MTU field 212 has a value representative of a current MTU for a corresponding path (e.g., a corresponding GRE tunnel).

If required, a packet identifier like a sequence number can be used for to confirm the packet. In some examples, an additional bit of reserved 0 field 204 may be used to hint to a receiving network device that a packet encapsulated by GRE header 200 is an echo packet that uses the techniques of this disclosure, i.e., to determine the PMTU. A packet encapsulated by GRE header 200 may be exchanged between network devices during a tunnel establishment phase.

In some examples, availability of the techniques of this disclosure may be determined by using a separate packet, e.g., encapsulated by GRE header 180. Initially, an original value of reserved 1 field 192 may be set equal to a special, pre-defined value (such as 65536). This value (or similar higher values above 65 k) may hint to the nodes along the path (or GRE tunnel) that this is an echo packet during the tunnel establishment phase (and/or PMTU technique selection phase). In general, nodes that support these techniques may modify the value of reserved 1 field 192 in a predetermined manner, and the value of MTU field 212 at the end point of the tunnel (i.e., the tunnel egress) may be used to infer if all the nodes on the path support/use this technique.

For Example: if there were 10 nodes, reserved 1 field 192 can be decreased by 1 at each supported node that supports these techniques. Thus, at the tunnel end point, the value in reserved 1 field 192 should be 65526 (65536−10). This value tells the number of nodes supporting this technique. The time to live (TTL) count can be used to infer the number of nodes on that path. The source device (tunnel egress) may check these two values to infer if all the nodes on the path support these techniques. That is, if fewer than all of the nodes support this technique, an alternative technique may be used, e.g., conventional PMTU determination techniques or a hybrid technique representing a combination of the techniques of this disclosure and conventional techniques. To indicate whether or not the techniques are supported, the end point may set the value of reserved 1 field 192 of an inner GRE header to a predetermined value, e.g., 65536 or over 65 k.

In general, the payload for these echo packets will be minimal. Therefore, these packets should not be dropped due to exceeding MTUs along the path. In the case that a link with a smaller MTU than the echo packets is encountered, ICMP errors may be received by upstream devices, in which case the PMTU determination can be performed using conventional techniques.

In some examples, an echo packet may be an echo Bidirectional Forwarding Detection (BFD) packet or other types of packets (e.g., Operations, administration and management (OAM) or others) that have an echo property (that is, being sent from a device and returned to that device), which can include data as discussed above for these techniques. For BFD echo, a diagnostic bit can be used in the packet along with an existing field, such as sequence number (currently used only in authentication) to provision for these techniques. In general, any other packets can also be used for these techniques for determining PMTU for a path between any two nodes. The techniques of this disclosure may further be extended to any scenario where two packets exchanging this information follow the techniques discussed above, and can be correlated together. Such packets could be, e.g., ICMP packets or IP packets with IP option fields used to carry the data discussed above.

Figure 8:
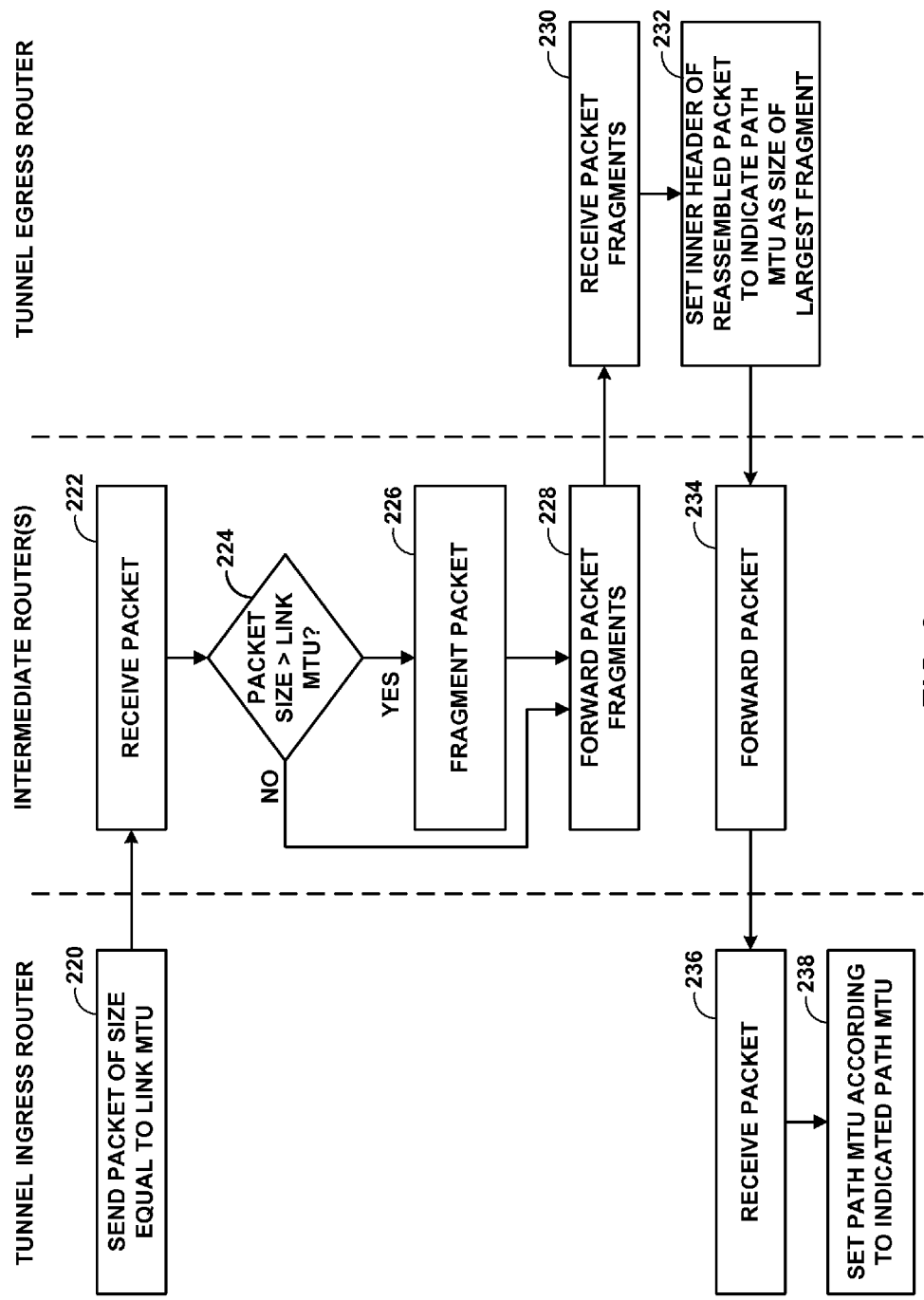
FIG. 8 is a flowchart illustrating another example method in accordance with the techniques of this disclosure for determining a PMTU.

FIG. 8 is a flowchart illustrating another example method in accordance with the techniques of this disclosure for determining a PMTU. FIG. 8 represents another, more particular implementation of the method of FIG. 4. In this example, packets that exceed an MTU of a network interface are fragmented, and destination network device 16 sets a value of an inner header of a reply packet to represent a size of the determined path MTU.

Initially, a tunnel ingress router (e.g., source network device 10 of FIG. 1) sends a packet of a size equal to the tunnel ingress router's link MTU for a next hop to an intermediate router of a network path (e.g., a network tunnel) (220). As originally constructed, the packet includes an outer header and an inner header, e.g., an outer GRE header with IPv4 and an inner GRE header with IPv4.

The intermediate routers may correspond to, for example, routers 12, 14 of FIG. 1. One of the intermediate routers receives the packet (222) and determines whether the packet size is greater than a link MTU size for a link to a next hop (224) (e.g., another intermediate router or a tunnel egress router). If the packet does not have a size larger than the link MTU ("NO" branch of 224), the intermediate router forwards the packet (228). However, if the packet has a size that is larger than the link MTU ("YES" branch of 224), the intermediate router fragments the packet into a plurality of packets (226). In particular, the intermediate router forms the fragments such that at least one of the fragments has a maximum size as allowed by the link MTU to the next hop. The intermediate router then forwards the packet fragments (228).

Ultimately, the tunnel egress router (e.g., destination network device 16) receives the packet fragments (230). The tunnel egress router determines that the path MTU corresponds to a size of the largest one of the received fragments. Accordingly, the tunnel egress router reassembles a second packet from the packet fragments and sets a value of a field of an inner header of the second packet to indicate the path MTU as the size of the largest received fragment (232). The tunnel egress router also the outer header from the second packet.

The tunnel egress router sends this new packet to the intermediate network routers. The intermediate routers forward the packet having the inner header representative of the path MTU (234) back to, ultimately, the tunnel ingress router. The tunnel ingress router receives the packet (236) and sets the path MTU according to the indicated path MTU (238), i.e., the data of the inner header of the received packet. For example, the path MTU may be represented by bits of the inner header that GRE indicates correspond to a reserved 1 field, as discussed above with respect to FIGS. 7A and 7B.

Figure 9:
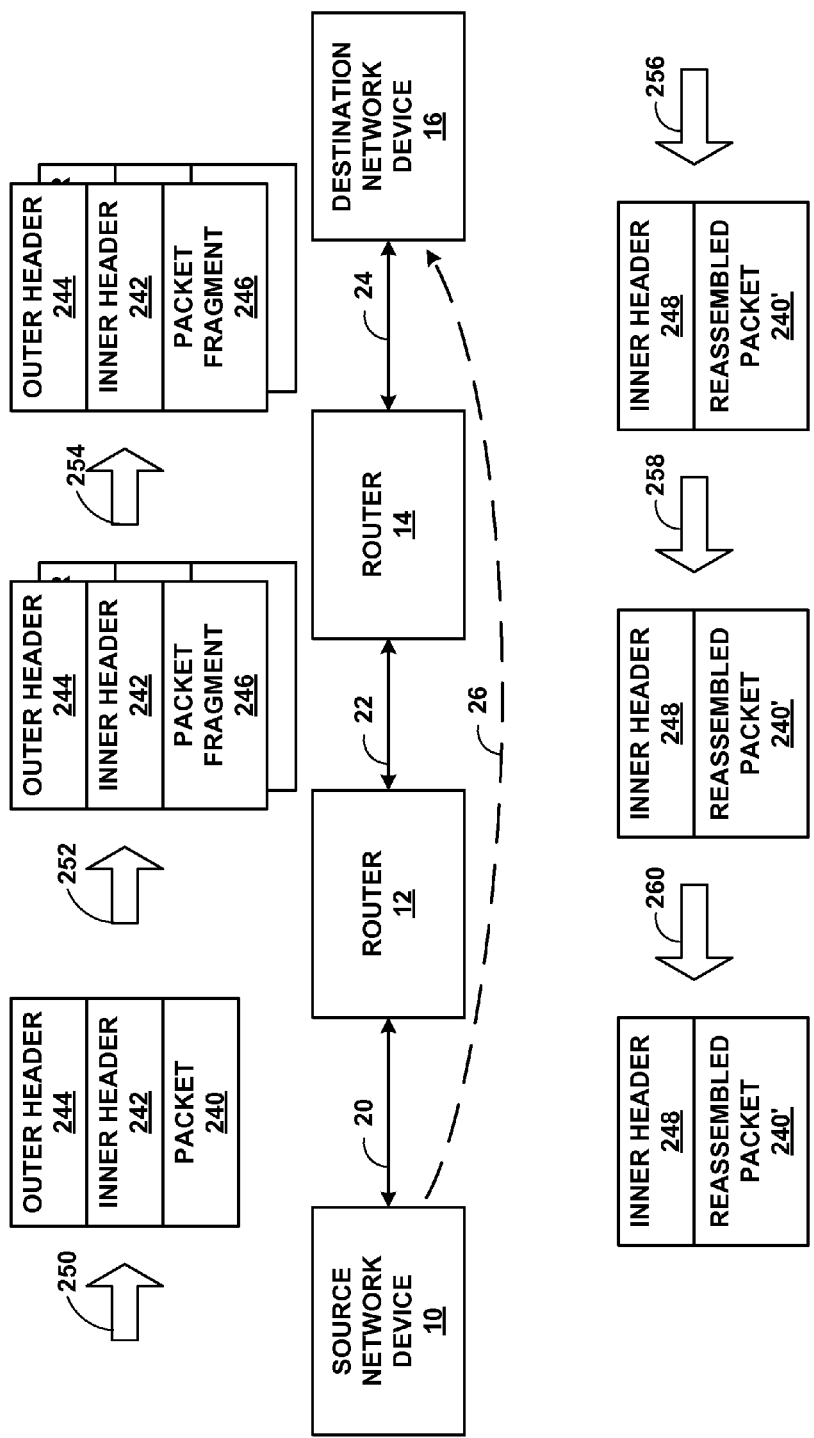
FIG. 9 is a conceptual diagram illustrating packets exchanged between the devices of FIG. 1 according to the example method of FIG. 8.

FIG. 9 is a conceptual diagram illustrating packets exchanged between the devices of FIG. 1 according to the example method of FIG. 8. Initially, source network device 10 constructs packet 240 (e.g., an echo packet) including data having a size equal to an MTU for link 20. Furthermore, source network device 10 encapsulates packet 240 with inner header 242 and outer header 244. Source network device 10 sends this packet to router 12 (250).

Router 12 receives the packet. In this example, it is assumed that the size of packet 240 is larger than the MTU for link 22. Thus, router 12 fragments the received packet into a plurality of fragments, at least one of which has a size that is equal to the MTU for link 22 (e.g., packet fragment 246). Router 12 sends the packet fragments to router 14 (252).

Router 14 receives the packet fragments. In this example, each of the packet fragments has a size that is less than the MTU of link 24. Thus, router 14 simply forwards the received packet fragments to destination network device 16 (254).

Destination network device 16 receives the packet fragments. Then, destination network device 16 determines which of the packet fragments is largest (in this example, packet fragment 246). Destination network device 16 removes outer header 244 from packet fragment 246 and also updates inner header 242 to have a value representative of the path MTU for path 26 (thereby forming inner header 248). For example, destination network device 16 may set a value of bits that GRE indicates correspond to a reserved 1 field to represent the path MTU, e.g., as discussed with respect to FIGS. 7A and 7B above. Destination network device 16 further reassembles the packet fragments into a second packet (reassembled packet 240') and encapsulates reassembled packet 240' with inner header 248, including data from inner header 242, such as the data indicative of the MTU. Destination network device 16 forwards this packet to router 14 (256).

Router 14 receives the packet and forwards the packet to router 12 (258). Router 12, in turn, receives the packet and forwards the packet to source network device 10 (260). Source network device 10 determines the path MTU from data of inner header 248, e.g., the reserved 1 field indicated by GRE.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by an egress network device of a network path:
receiving a first packet including data indicative of a maximum transmission unit (MTU) for the network path;
forming, from the first packet, a second packet to include a path header corresponding to the network path such that the path header includes the data indicative of the MTU for the network path, wherein forming the second packet comprises:
setting a value of at least one bit of a first set of bits of the path header to a value indicating that the second packet includes the data indicative of the MTU; and
setting a second set of bits of the path header to values representative of the data indicative of the MTU; and
sending the second packet to an ingress network device of the network path.

2. The method of claim 1, wherein the first packet further includes data indicating that the first packet includes the data indicative of the MTU for the network path.

3. The method of claim 1, wherein the path header substantially conforms to a generic routing encapsulation (GRE) header, wherein the first set of bits comprises a set of bits that a GRE standard identifies as a reserved 0 field, and wherein the second set of bits comprises a set of bits that the GRE standard identifies as a reserved 1 field.

4. The method of claim 1, wherein the data indicative of the MTU comprises data indicative of a size of the first packet.

5. The method of claim 1, wherein the first packet comprises a first fragment of a plurality fragments for a common packet received via the network path, the method further comprising:
determining sizes for the plurality of fragments; and
determining that the size of the first fragment is larger than the sizes for the other fragments of the plurality of fragments,
wherein the data indicative of the MTU comprises data indicative of the size of the first fragment.

6. The method of claim 5, further comprising receiving the plurality of fragments in accordance with Internet protocol version 4 (IPv4), wherein all but an ordinal last fragment of the plurality of fragments include values of true for more-fragments flags in headers of the plurality of fragments.

7. The method of claim 5, wherein the first fragment is encapsulated by an inner header and an outer header, and wherein forming the second packet comprises:
reassembling the plurality of fragments into the second packet; and
encapsulating the second packet with the inner header of the first fragment such that the inner header includes the data indicative of the MTU.

8. The method of claim 7, wherein forming the second packet further comprises removing the outer header from the first fragment.

9. The method of claim 1, wherein the first packet is encapsulated by an inner header and an outer header, wherein the data indicative of the MTU comprises data of the outer header, and wherein forming the second packet comprises updating a value of the inner header to represent the MTU based on the data of the outer header.

10. The method of claim 9, wherein forming the second packet further comprises removing the outer header from the first packet.

11. The method of claim 1, further comprising, prior to receiving the first packet, negotiating, with the ingress network device, a technique by which to send the data indicative of the MTU to the ingress network device.

12. The method of claim 1, wherein the network path comprises a network tunnel.

13. The method of claim 12, wherein the network tunnel comprises a generic routing encapsulation (GRE) tunnel.

14. The method of claim 12, wherein the first packet comprises one of an echo packet of GRE Keepalive, Bidirectional Forwarding Detection (BFD), or Operations, Administration, and Maintenance (OAM).

15. The method of claim 1, wherein the path header substantially conforms to a generic routing encapsulation (GRE) header, wherein the at least one bit of the first set of bits follows a sequence number bit of the GRE header, and wherein the second set of bits follow a checksum field of the GRE header.

16. An egress network device for a network path, the egress network device comprising:
one or more network interfaces configured to send packets to an upstream network device of the network path and to receive packets from the upstream network device; and
a processing unit implemented in circuitry and configured to:
receive, via the one or more network interfaces, a first packet including data indicative of a maximum transmission unit (MTU) for the network path;
form, from the first packet, a second packet to include a path header corresponding to the network path such that the path header includes the data indicative of the MTU for the network path, wherein to form the second packet, the processing unit is configured to:
set a value of at least one bit of a first set of bits of the path header to a value indicating that the second packet includes the data indicative of the MTU; and
set a second set of bits of the path header to values representative of the data indicative of the MTU; and
send, via the one or more network interfaces and the upstream network device, the second packet to an ingress network device of the network path.

17. The egress network device of claim 16, wherein the first packet further includes data indicating that the first packet includes the data indicative of the MTU for the network path.

18. The egress network device of claim 16, wherein the path header substantially conforms to a generic routing encapsulation (GRE) header, wherein the first set of bits comprises a set of bits that a GRE standard identifies as a reserved 0 field, and wherein the second set of bits comprises a set of bits that the GRE standard identifies as a reserved 1 field.

19. The egress network device of claim 16, wherein the first packet comprises a first fragment of a plurality fragments for a common packet received via the network path,
wherein the processing unit is further configured to:
determine sizes for the plurality of fragments; and
determine that the size of the first fragment is larger than the sizes for the other fragments of the plurality of fragments, and
wherein the data indicative of the MTU comprises data indicative of the size of the first fragment.

20. The egress network device of claim 16, wherein the first packet is encapsulated by an inner header and an outer header, wherein the data indicative of the MTU comprises data of the outer header, and wherein to form the second packet, the processing unit is configured to:
reassemble the plurality of fragments into the second packet; and
encapsulate the second packet with the inner header of the first fragment such that the inner header includes the data indicative of the MTU.

21. A non-transitory computer-readable storage medium comprising instructions that, when executed, cause a processor of an egress network device of a network path to:
receive a packet including data indicative of a maximum transmission unit (MTU) for the network path;
form, from the first packet, a second packet to include a path header corresponding to the network path such that the path header includes the data indicative of the MTU for the network path, wherein the instructions that cause the processor to form the second packet comprise instructions that cause the processor to:
set a value of at least one bit of a first set of bits of the path header to a value indicating that the second packet includes the data indicative of the MTU; and
set a second set of bits of the path header to values representative of the data indicative of the MTU; and
send the second packet to an ingress network device of the network path.

22. The non-transitory computer-readable storage medium of claim 21, wherein the first packet further includes data indicating that the first packet includes the data indicative of the MTU for the network path.

23. The non-transitory computer-readable storage medium of claim 21, wherein the path header substantially conforms to a generic routing encapsulation (GRE) header, wherein the first set of bits comprises a set of bits that a GRE standard identifies as a reserved 0 field, and wherein the second set of bits comprises a set of bits that the GRE standard identifies as a reserved 1 field.

24. The non-transitory computer-readable storage medium of claim 21, wherein the first packet comprises a first fragment of a plurality fragments for a common packet received via the network path, further comprising instructions that cause the processor to:
determine sizes for the plurality of fragments; and
determine that the size of the first fragment is larger than the sizes for the other fragments of the plurality of fragments,
wherein the data indicative of the MTU comprises data indicative of the size of the first fragment.

25. The non-transitory computer-readable storage medium of claim 21, wherein the first packet is encapsulated by an inner header and an outer header, wherein the data indicative of the MTU comprises data of the outer header, and wherein the instructions that cause the processor to form the second packet comprise instructions that cause the processor to:
reassemble the plurality of fragments into the second packet; and
encapsulate the second packet with the inner header of the first fragment such that the inner header includes the data indicative of the MTU.

26. A method comprising, by an intermediate network device of a network path:
receiving a first packet including data indicative of a current maximum transmission unit (MTU) for the network path;
determining that a value of at least one bit of a first set of bits of a path header of the first packet, the path header corresponding to the network path, indicates that the first packet includes the data indicative of the current MTU;
determining the current MTU from a second set of bits of the path header having values representative of the current MTU;
determining whether the current MTU for the network path is greater than an MTU for a network interface of the intermediate network device that is coupled to a downstream network device of the network path; and
when the current MTU is greater than the MTU for the network interface, sending a second packet to the downstream network device, the second packet including data indicative of the MTU for the network interface as a new MTU for the network path.

27. The method of claim 26, wherein the first packet further includes data indicating that the first packet includes the data indicative of the MTU for the network path, and wherein the second packet further includes data indicating that the first packet includes the data indicative of the MTU for the network path.

28. The method of claim 26, wherein sending the second packet comprises:
fragmenting the first packet into a plurality of fragments such that the second packet includes one of the plurality of fragments, wherein sizes of the plurality of fragments are no larger than a size of the fragment included in the second packet, and wherein the data indicative of the new MTU for the network path comprises a size of the second packet; and
sending the plurality of fragments to the downstream network device.

29. The method of claim 28, wherein fragmenting comprises forming the plurality of fragments such that the size of the second packet is equal to the MTU for the network interface.

30. The method of claim 26, wherein the first packet is encapsulated by an outer header and an inner header, and wherein the outer header includes the data indicative of the current MTU, the method further comprising updating the data of the outer header such that the outer header includes the data indicative of the MTU for the network interface to form the second packet from the first packet.

31. The method of claim 26, wherein the first packet is encapsulated by a generic routing encapsulation (GRE) header comprising the path header, wherein the second set of bits comprises a set of bits that a GRE standard identifies as a reserved 1 field, the method further comprising, when the current MTU is greater than the MTU for the network interface, forming the second packet to include a GRE header including a third set of bits that the GRE standard identifies as the reserved 1 field having values representative of the MTU for the network interface.

32. An intermediate network device of a network path, the intermediate network device comprising:
one or more network interfaces configured to receive packets from an upstream network device of the network path and to send packets to a downstream network device of the network path; and
a processing unit configured to:
receive a first packet including data indicative of a current maximum transmission unit (MTU) for the network path via the one or more network interfaces from the upstream network device;
determine that a value of at least one bit of a first set of bits of a path header of the first packet, the path header corresponding to the network path, indicates that the first packet includes the data indicative of the current MTU;

determine the current MTU from a second set of bits of the path header having values representative of the current MTU;

determine whether the current MTU for the network path is greater than an MTU for a network interface of the network interfaces that is coupled to the downstream network device; and when the current MTU is greater than the MTU for the network interface, send a second packet to the downstream network device via the network interface coupled to the downstream network device, the second packet including data indicative of the MTU for the network interface as a new MTU for the network path.

33. The intermediate network device of claim 32, wherein the first packet further includes data indicating that the first packet includes the data indicative of the MTU for the network path, and wherein the second packet further includes data indicating that the first packet includes the data indicative of the MTU for the network path.

34. The intermediate network device of claim 32, wherein to send the second packet, the processing unit is configured to:

fragment the first packet into a plurality of fragments such that the second packet includes one of the plurality of fragments, such that sizes of the plurality of fragments are no larger than a size of the fragment included in the second packet, and such that a size of the second packet is equal to the MTU for the network interface, wherein the data indicative of the new MTU for the network path comprises the size of the second packet; and send the plurality of fragments to the downstream network device.

35. The intermediate network device of claim 32, wherein the first packet is encapsulated by an outer header and an inner header, wherein the outer header includes the data indicative of the current MTU, and wherein the processing unit is configured to update the data of the outer header such that the outer header includes the data indicative of the MTU for the network interface to form the second packet from the first packet.

36. The intermediate network device of claim 32, wherein the first packet is encapsulated by a generic routing encapsulation (GRE) header comprising the path header, wherein the second set of bits comprises a set of bits that a GRE standard identifies as a reserved 1 field, and wherein the processing unit is further configured to, when the current MTU is greater than the MTU for the network interface, form the second packet to include a GRE header including a third set of bits that the GRE standard identifies as the reserved 1 field having values representative of the MTU for the network interface.

37. A non-transitory computer-readable storage medium having stored thereon instructions that, when executed, cause a processor of an intermediate network device of a network path to:

receive a first packet including data indicative of a current maximum transmission unit (MTU) for the network path;

determine that a value of at least one bit of a first set of bits of a path header of the first packet, the path header corresponding to the network path, indicates that the first packet includes the data indicative of the current MTU;

determine the current MTU from a second set of bits of the path header having values representative of the current MTU;

determine whether the current MTU for the network path is greater than an MTU for a network interface of the intermediate network device that is coupled to a downstream network device of the network path; and when the current MTU is greater than the MTU for the network interface, send a second packet to the downstream network device, the second packet including data indicative of the MTU for the network interface as a new MTU for the network path.

38. The non-transitory computer-readable storage medium of claim 37, wherein the first packet further includes data indicating that the first packet includes the data indicative of the MTU for the network path, and wherein the second packet further includes data indicating that the first packet includes the data indicative of the MTU for the network path.

39. The non-transitory computer-readable storage medium of claim 37, wherein the instructions that cause the processor to send the second packet comprise instructions that cause the processor to:

fragment the first packet into a plurality of fragments such that the second packet includes one of the plurality of fragments, such that sizes of the plurality of fragments are no larger than a size of the fragment included in the second packet, and such that a size of the second packet is equal to the MTU for the network interface, wherein the data indicative of the new MTU for the network path comprises the size of the second packet; and send the plurality of fragments to the downstream network device.

40. The non-transitory computer-readable storage medium of claim 37, wherein the first packet is encapsulated by an outer header and an inner header, wherein the outer header includes the data indicative of the current MTU, and wherein the instructions that cause the processor to update the data of the outer header such that the outer header includes the data indicative of the MTU for the network interface to form the second packet from the first packet.

41. The non-transitory computer-readable storage medium of claim 37, wherein the first packet is encapsulated by a generic routing encapsulation (GRE) header comprising the path header, wherein the second set of bits comprises a set of bits that a GRE standard identifies as a reserved 1 field, further comprising instructions to, when the current MTU is greater than the MTU for the network interface, form the second packet to include a GRE header including a third set of bits that the GRE standard identifies as the reserved 1 field having values representative of the MTU for the network interface.

42. A system comprising:

an ingress network device of a network path;

an egress network device of the network path; and one or more intermediate network devices of the network path between the ingress network device and the egress network device, wherein the intermediate network devices are configured to:

receive a first packet including data indicative of a current maximum transmission unit (MTU) for the network path;

determine that a value of at least one bit of a first set of bits of a path header of the first packet, the path header corresponding to the network path, indicates that the first packet includes the data indicative of the current MTU;

determine the current MTU from a second set of bits of the path header having values representative of the current MTU;

determine whether the current MTU for the network path is greater than an MTU for a network interface of the corresponding intermediate network device that is coupled to a downstream network device of the network path, the downstream network device comprising one of the intermediate network devices or the egress network device; and when the current MTU is greater than the MTU for the network interface, send a second packet to the downstream network device, the second packet including data indicative of the MTU for the network interface as a new MTU for the network path, and wherein the egress network device is configured to:

receive a third packet including data indicative of a final maximum transmission unit (MTU) for the network path;

form, from the third packet, a fourth packet to include a path header corresponding to the network path such that the path header includes the data indicative of the final MTU for the network path, wherein to form the fourth packet, the intermediate networking devices are configured to:

set a value of at least one bit of a third set of bits of the path header of the fourth packet to a value indicating that the fourth packet includes the data indicative of the final MTU; and set a fourth set of bits of the path header of the fourth packet to values representative of the data indicative of the final MTU; and send the fourth packet to the ingress network device of the network path.

43. The system of claim 42,
wherein to send the second packet, the intermediate network devices are configured to:
fragment the first packet into a plurality of fragments such that the second packet includes one of the plurality of fragments, such that sizes of the plurality of fragments are no larger than a size of the fragment included in the second packet, and such that a size of the second packet is equal to the MTU for the network interface, wherein the data indicative of the new MTU for the network path comprises the size of the second packet; and
send the plurality of fragments to the downstream network device, and
wherein the egress network device is further configured to:
receive the plurality of fragments, including receiving the second packet;
determine sizes for the plurality of fragments;
determine that the size of the fragment included in the second packet is larger than the sizes for packets included the other fragments of the plurality of fragments; and
determine that the size of the final MTU is equal to the size of the second packet.

44. The system of claim 42,
wherein the first packet is encapsulated by an outer header and an inner header, wherein the outer header includes the data indicative of the current MTU, and wherein the intermediate network devices are configured to update the data of the outer header such that the outer header includes the data indicative of the MTU for the network interface to form the second packet from the first packet, and
wherein to form the fourth packet, the egress network device is configured to update a value of the inner header to represent the MTU based on the data of the outer header, such that the path header comprises the updated inner header.

\* \* \* \* \*